United States Patent
Reed et al.

(10) Patent No.: US 7,205,881 B2
(45) Date of Patent: Apr. 17, 2007

(54) HIGHLY PARALLEL SWITCHING SYSTEMS UTILIZING ERROR CORRECTION II

(75) Inventors: Coke S. Reed, Cranbury, NJ (US); David Murphy, Austin, TX (US)

(73) Assignee: Interactic Holdings, LLC, Austin, TX (US)

( * ) Notice: Subject to any disclaimer, the term of this patent is extended or adjusted under 35 U.S.C. 154(b) by 0 days.

(21) Appl. No.: 11/074,406

(22) Filed: Mar. 8, 2005

(65) Prior Publication Data
US 2006/0029058 A1    Feb. 9, 2006

(51) Int. Cl.
*H04Q 3/00* (2006.01)
*H04Q 11/00* (2006.01)
(52) U.S. Cl. .................. 340/2.24; 340/2.21
(58) Field of Classification Search .......... 340/2.24, 340/2.21
See application file for complete search history.

(56) References Cited

U.S. PATENT DOCUMENTS 6,657,998 B2 * 12/2003 Li .......................... 370/388
6,754,207 B1 * 6/2004 Hesse .................... 370/388
6,798,744 B1 * 9/2004 Loewen et al. ......... 370/235

* cited by examiner

*Primary Examiner*—Wendy R. Garber
*Assistant Examiner*—Clara Yang
(74) *Attorney, Agent, or Firm*—Keith D. Nowak; Carter Ledyard & Milburn LLP

(57) ABSTRACT

An interconnection network has a first stage network and a second stage network and a collection of devices outside the network so that a first device is capable of sending data to a second device. The first stage network is connected to inputs of the second stage network. The first and second stage networks each have more outputs than inputs. The data is first sent from the first device to the first stage network and then from the first stage network to the second stage network. The data is sent to the second device from the second stage network. The number of inputs to a device from the second stage network exceeds the number of outputs from a device into the first stage network. The latency through the entire system may be a fixed constant.

10 Claims, 26 Drawing Sheets

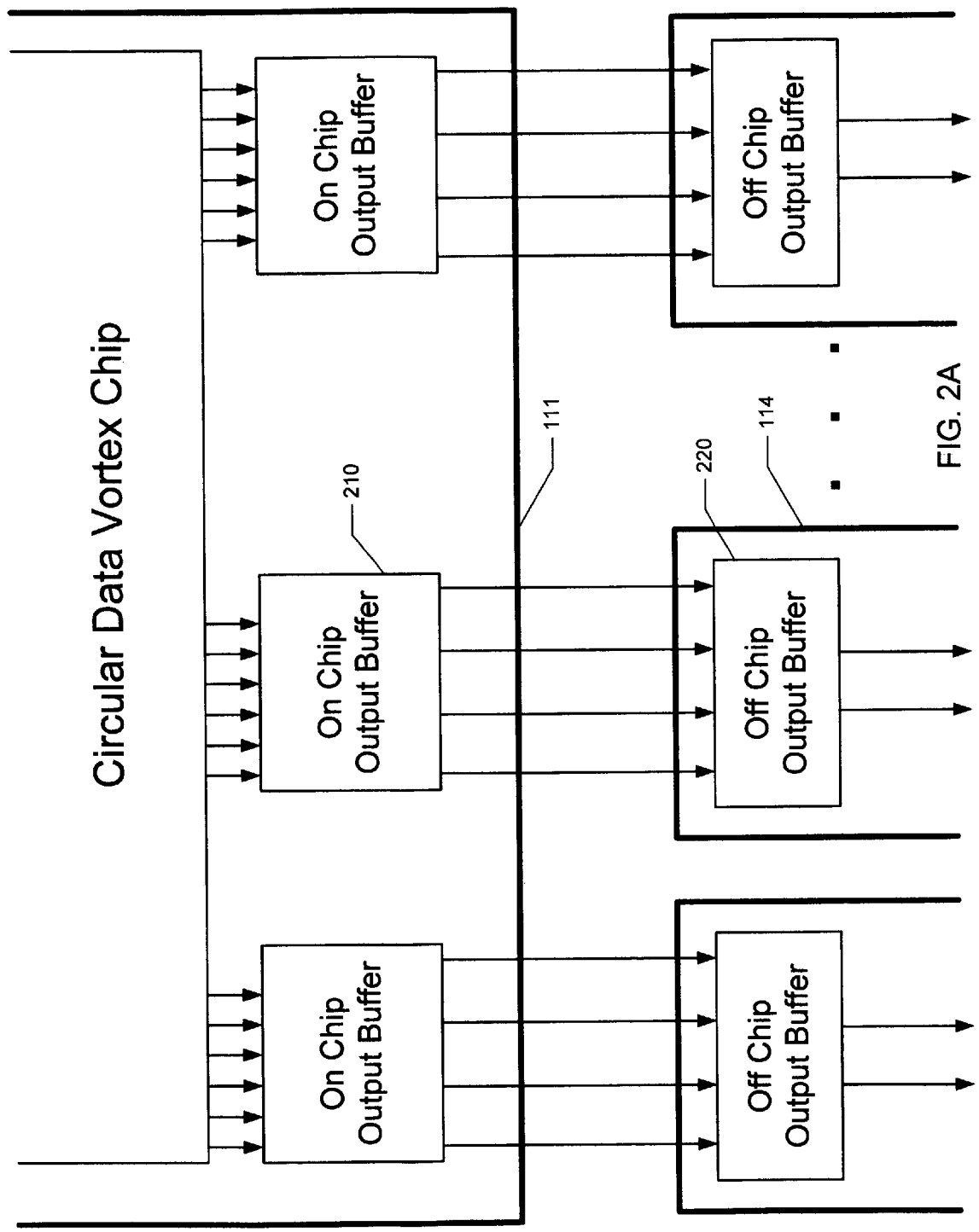

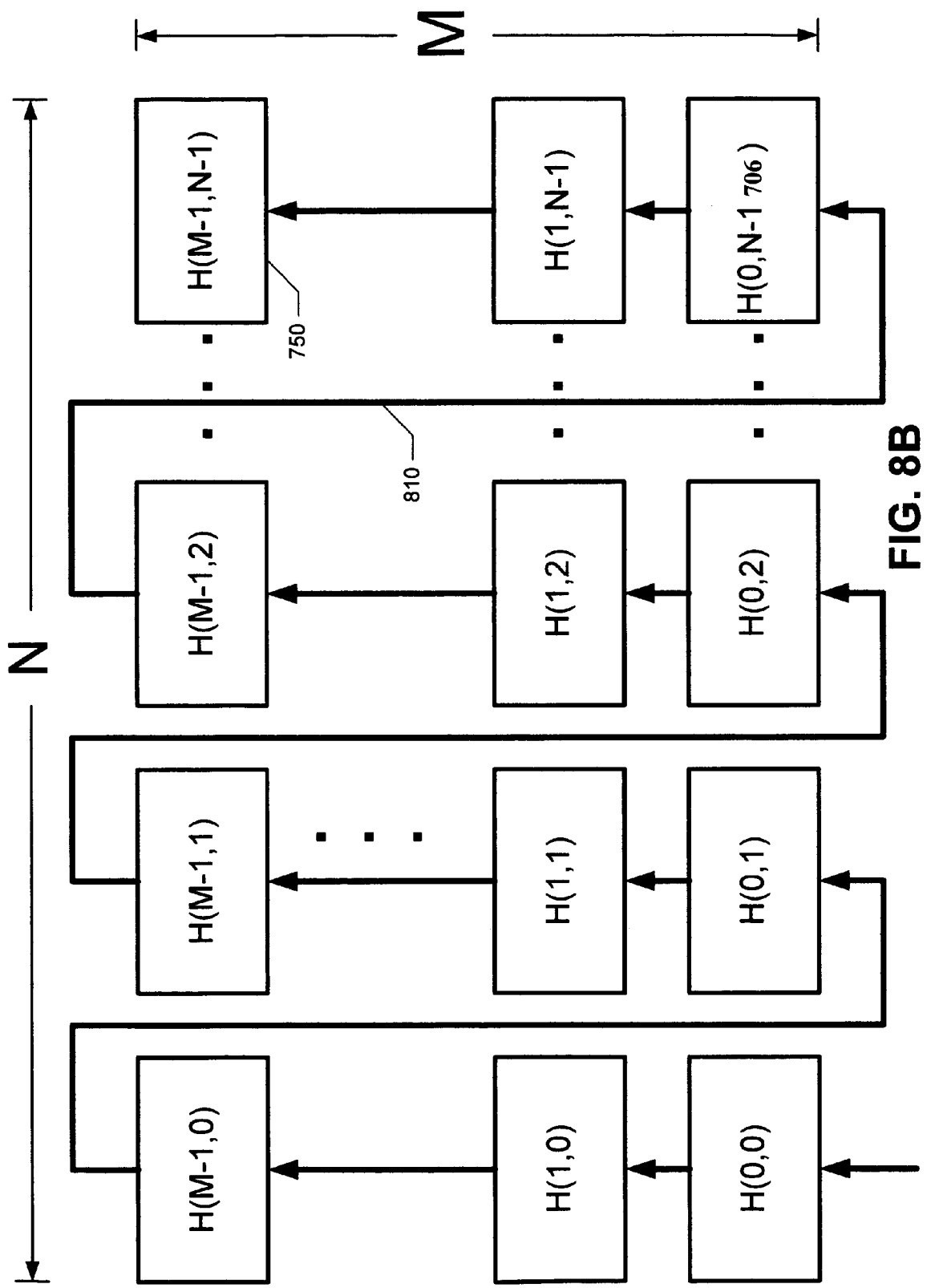

HIGHLY PARALLEL SWITCHING SYSTEMS UTILIZING ERROR CORRECTION II

RELATED PATENTS AND PATENT APPLICATIONS

The disclosed system and operating method are related to subject matter disclosed in the following patents and patent applications that are incorporated by reference herein in their entirety:
1. U.S. Pat. No. 5,996,020 entitled, "A Multiple Level Minimum Logic Network", naming Coke S. Reed as inventor;
2. U.S. Pat. No. 6,289,021 entitled, "A Scaleable Low Latency Switch for Usage in an Interconnect Structure", naming John Hesse as inventor;
3. U.S. Pat. No. 6,754,207 entitled, "Multiple Path Wormhole Interconnect", naming John Hesse as inventor;
4. U.S. Pat. No. 6,687,253 entitled, "Scalable Wormhole-Routing Concentrator", naming John Hesse and Coke Reed as inventors;
5. U.S. patent application Ser. No. 09/693,603 entitled, "Scaleable Interconnect Structure for Parallel Computing and Parallel Memory Access", naming John Hesse and Coke Reed as inventors;
6. U.S. patent application Ser. No. 09/693,358 entitled, "Scalable Interconnect Structure Utilizing Quality-Of-Service Handling", naming Coke Reed and John Hesse as inventors;
7. U.S. patent application Ser. No. 09/692,073 entitled, "Scalable Method and Apparatus for Increasing Throughput in Multiple Level Minimum Logic Networks Using a Plurality of Control Lines", naming Coke Reed and John Hesse as inventors;
8. U.S. patent application Ser. No. 09/919,462 entitled, "Means and Apparatus for a Scaleable Congestion Free Switching System with Intelligent Control", naming John Hesse and Coke Reed as inventors;
9. U.S. patent application Ser. No. 10/123,382 entitled, "A Controlled Shared Memory Smart Switch System", naming Coke S. Reed and David Murphy as inventors;
10. U.S. patent application Ser. No. 10/123,902 entitled, "Means and Apparatus for a Scaleable Congestion Free Switching System with Intelligent Control II", naming Coke Reed and David Murphy as inventors;
11. U.S. patent application Ser. No. 10/798,526 entitled, "Means and Apparatus for a Scalable Network for Use in Computing and Data Storage Management", naming Coke Reed and David Murphy as inventors;
12. U.S. patent application Ser. No. 10/866,461 entitled, "Means and Apparatus for Scalable Distributed Parallel Access Memory Systems with Internet Routing Applications", naming Coke Reed and David Murphy as inventors;
13. U.S. patent application Ser. No. 10/515,937 entitled, "Means and Apparatus for a Self-Regulating Interconnect Structure", naming Coke Reed as inventor;
14. U.S. patent application Ser. No. 60/515,937 entitled "Highly Parallel Switching Systems Utilizing Error Correction", naming Coke Reed and David Murphy as inventors.

BACKGROUND

Interconnect network technology is a fundamental component of computational and communications products ranging from supercomputers to grid computing switches to a growing number of routers. However, characteristics of existing interconnect technology result in significant limits in scalability of systems that rely on the technology.

For example, even with advances in supercomputers of the past decade, supercomputer interconnect network latency continues to limit the capability to cost-effectively meet demands of data-transfer-intensive computational problems arising in the fields of basic physics, climate and environmental modeling, pattern matching in DNA sequencing, and the like.

For example, in a Cray T3E supercomputer, processors are interconnected in a three-dimensional bi-directional torus. Due to latency of the architecture, for a class of computational kernels involving intensive data transfers, on the average, 95% to 98% of the processors are idle while waiting for data. Moreover, in the architecture about half the boards in the computer are network boards. Consequentially, a floating point operation performed on the machine can be up to 100 times as costly as a floating point operation on a personal computer.

As both computing power of microprocessors and the cost of parallel computing have increased, the concept of networking high-end workstations to provide an alternative parallel processing platform has evolved. Fundamental to a cost-effective solution to cluster computing is a scalable interconnect network with high bandwidth and low latency. To date, the solutions have depended on special-purpose hardware such as Myrinet and QsNet.

Small switching systems using Myrinet and QsNet have reasonably high bandwidth and moderately low latency, but scalability in terms of cost and latency suffer from the same problems found in supercomputer networks because both are based on small crossbar fabrics connected in multiple-node configurations, such as Clos network, fat tree, or torus. The large interconnect made of crossbars is fundamentally limited.

A similar scalability limit has been reached in today's Internet Protocol (IP) routers in which a maximum of 32 ports is the rule as line speeds have increased to OC192.

Many years of research and development have been spent in a search for a "scalable" interconnect architecture that will meet the ever-increasing demands of next-generation applications across many industries. However, even with significant evolutionary advancements in the capacity of architectures over the years, existing architectures cannot meet the increasing demands in a cost-effective manner.

SUMMARY

An interconnect structure connecting N groups of processing elements with M processing elements in each group is described. The interconnect structure consists of two network stages $N_1$ and $N_2$, and two sets of switches S and T. A data packet p is passed from a processing element x in one of the N groups of processing elements to a processing element y in one of the N groups of processing elements by sending p through $N_1$ and then through a switch s in S and then through $N_2$ and then through a switch t in T. Both $N_1$ and $N_2$ have more outputs than inputs enabling a receiving processor to simultaneously receive data from a collection of sending processors. The processor y employs a scheduling mechanism to control the setting of the switches s and t thereby enabling the latency through the entire system to be a fixed constant.

BRIEF DESCRIPTION OF THE DRAWINGS

FIG. 2A illustrates the output section of an MLML Data Vortex switch employing on chip buffers on the request switch of a communication chip.

FIG. 8B illustrates an embodiment of a first pattern for connecting the output ports of the hosts to the input ports of the network.

DETAILED DESCRIPTION

Figure 1A:
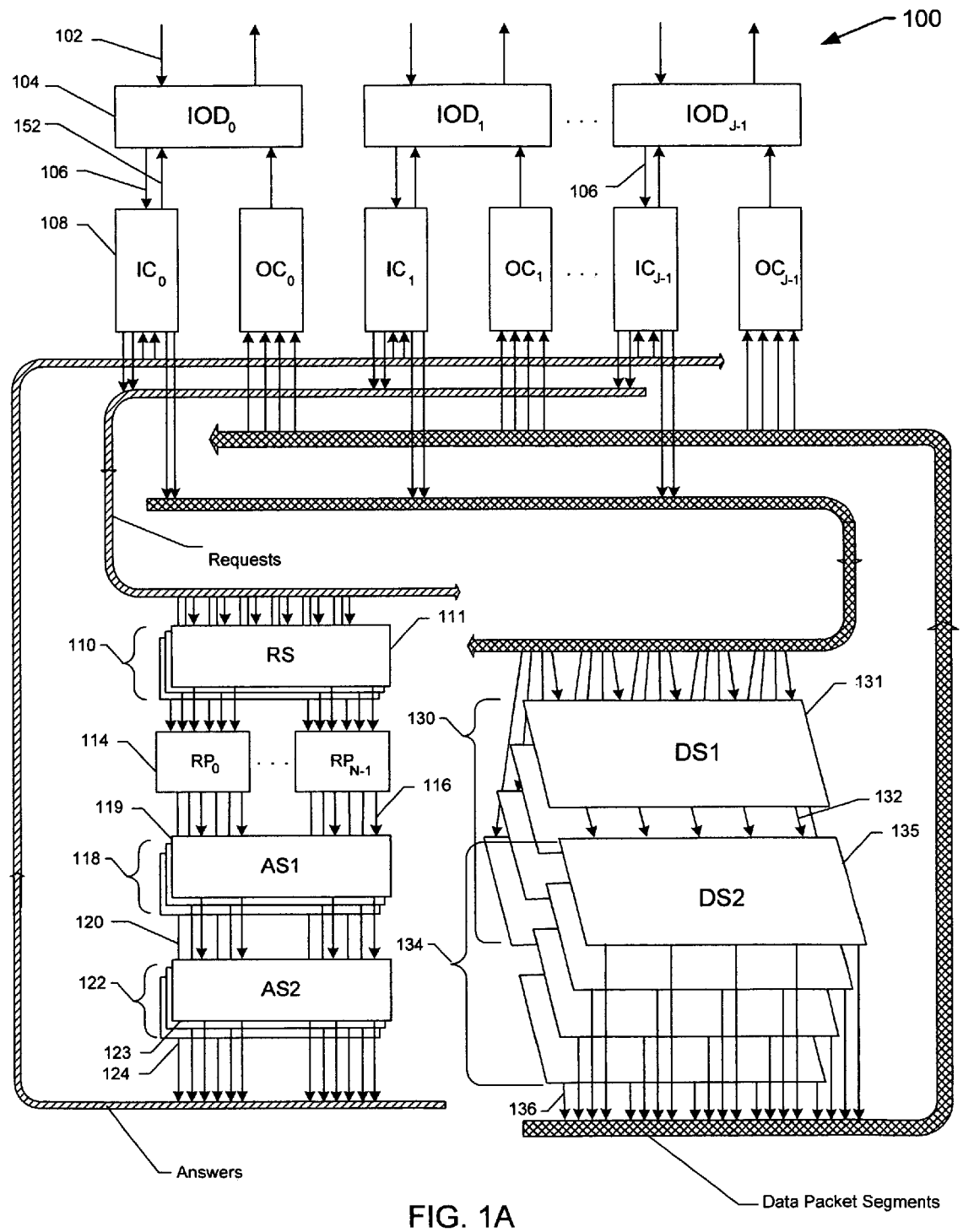
FIG. 1A illustrates an embodiment of a communication system which utilizes both a plurality of MLML Data Vortex networks and also a plurality of MLML stair-step interconnects.

In a wide variety of computing and communication systems, processors and storage devices communicate via a network. The interconnect structures described in the incorporated references are highly suitable for use in interconnecting a large number devices when low latency and high bandwidth are desired. The fact that these interconnects are self-routing can be exploited. The ability of the networks to deliver multiple packets simultaneously to a given network output port may also be sought. Two types of multiple-level, minimum-logic (MLML) interconnects are used in the systems taught in references No. 8, No. 10, No. 11 and No. 14. In the first type of interconnect taught in incorporated references No. 1 and No. 2 (termed a Data Vortex switch), levels comprise circular shift registers (rings). In the second type of interconnect introduced in reference No. 3 (referred to as a stair-step interconnect), a portion of each ring is omitted so that each level consists of a collection of non-circular shift registers. In incorporated references No. 8 and No. 10, stair-step switches of the type taught in patent No. 3 can be used to carry the data. The stair-step switches are also used to carry data in the scheduled data switches taught in references No. 11 and No. 14.

For applications presented in the two aforementioned references, multiple copies of the stair-step switches can be used in order to decrease the latency of the last bit of each packet and also to increase the bandwidth of the interconnect structure. In embodiments using multiple switches, the incorporated references No. 8 and No. 10 teach the technique of decomposing packet segments into sub-segments and then simultaneously sending the sub-segments through a set (or stack) of stair-step switches such that no two sub-segments pass through the same switch in the set; each stair-step switch in the set is followed by an additional switch composed of a plurality of crossbar switches. The same structure, comprising a stack of stair-step switches each followed by plurality of crossbar switches (one crossbar for each shift register of the exit level of the stair-step switch), can be used to carry the data in the scheduled data switches employed in references No. 11 and 14.

Reference No. 14 discloses a structure and method for error correction enabling correction of errors in the payloads of packet segments as well as correcting errors that occur from misrouted packet sub-segments. This error correction is accomplished for packet segments that are routed through stacks of networks, including stacks of networks with each network of the stack being of the stair-step design of the type taught in reference No. 3. Reference No, 14 describes error correction in stacks of networks, with each member of the stack being a switch of the type taught in reference No. 1 and No. 2. Reference No. 14 also describes error correction in packet segments that are routed through stacks of networks, with each network of the stack being of the stair-step design of the type taught in reference No. 3 (where each switch in the stack is followed by a plurality of crossbar switches). There is a crossbar switch associated with each bottom level shift register of each stair-step interconnect of the stack.

Reference No. 14 further illustrates correcting an error that occurs when a sub-segment of a packet segment does not exit through an output port of a stair-step interconnect structure (for example, the sub-segment is discarded by the switch). Reference No. 14 also shows error correction for packets entering the request and answer switches of reference No. 8 and reference No. 10 and also for packets entering the uncontrolled switches of the uncontrolled interconnect structure described in the computing and storage area networks taught in reference No. 11 and reference No. 14. Reference No. 14 shows error correction for packets passing through the self-regulated switches described in reference No. 13. Therefore, reference No. 14 discloses methods and structures supplying error correction to a wide class of data switching systems.

The switch chips used in reference No. 14 contain multiple hop wormhole interconnect systems where the number of switch output ports exceeds the number of switch input ports. In one embodiment, the configuration enables multiple switch output ports to carry data to the same data receiving processor. In reference No. 14, Data packets traveling between processors pass through only one switch chip. The reference No. 14 systems are multiple hop MLML systems on a chip but are single hop between chips. The number of processors that can be connected by systems described by reference No. 14 is limited by the number of chip I/O ports. Reference No. 2 describes a method of sending data through multiple MLML switches. The structures shown in reference No. 2 enable data traveling between processors to travel through 2 switch chips enabling the number of connected devices to be the square of the number of chip I/O ports. The systems can be generalized to systems where the data travels through N switch chips enabling the number of connected devices to be number of chip I/O devices raised to the Nth power. Provisional reference No. 16 uses novel extensions of references No. 2 and No. 14 to enable systems with a very large number of processors to be connected in a system that has the error correction properties of reference No. 14 combined with a generalization of the multi-hop between chip properties of reference No. 2. This generalization exploits the fact that Data Vortex™ chips have more output ports than input ports.

Multiple devices are connected by a collection of networks. The devices are arranged in N Groups of computational units with each group containing M computational units so that the entire system has N·M computational units. A given computation unit may contain one or more processors and also may contain memory. The groups of M computational units may be contained in a cabinet or a rack so that the system can be described as N interconnected cabinets of processors and memory. The system can be configured as an interconnected group of N parallel computers. A central switching hub connects the N parallel machines in a manner that provides extremely low latency and high bandwidth. In an example system described herein, N=256 and M=64.

An illustrative central switching hub contains both circular Data Vortex™ chips for carrying short messages and stair-step Data Vortex™ chips for carrying longer messages. The networks employ the type of error correction described in incorporated reference No. 14.

An aspect of some of the disclosed embodiments is a central hub composed of multiple independent networks. In some of the disclosed embodiments, the independent networks are termed building blocks. Some of the building blocks carry shorter message packets and some of the building blocks carry longer message packets. The central hub contains two independent networks $N_1$ and $N_2$ with $N_1$ and $N_2$ being constructed using building blocks for carrying shorter messages and also building blocks for carrying longer messages. In one embodiment, the networks $N_1$ and $N_2$ have the same topology. If group G is one of the N groups comprising M computational units, then a given computational unit X in group G is positioned to send message packets to both $N_1$ and $N_2$. Moreover, both $N_1$ and $N_2$ carry messages that are destined for X. An aspect of some embodiments of the illustrative structure is that the members of group G have a first connection scheme for sending message packets to $N_1$ and a second connection scheme for sending message packets to $N_2$. Two computational units X and Y in G that are interconnected to $N_1$ to send message packets to the same building block in $N_1$ are interconnected to $N_2$ so that X and Y do not send message packets to the same building block. The two interconnection schemes to $N_1$ and $N_2$ enable hard wired global data "corner turns."

The building blocks for carrying short messages are built using circular Data Vortex™ chips. The building blocks for carrying long messages are built using stacks of stair-step Data Vortex™ chips. In addition to the networks in the central hub, multiple networks are associated with the N groups of M processors. The group G of M computational units has an associated network for carrying data between processors within the group G. The network connecting the processors within group G is of the type described in incorporated reference No. 14 and reviewed again in the embodiments described herein. Additionally, a collection of networks receive data packets from the central hub and forward the messages to target computational units in group G. A collection of networks $NG_1$ receive messages from $N_1$ and forward the messages to target group G computational unit input ports. A collection of networks $NG_2$ receive data packets from $N_2$ and forward those messages to target group G computational unit input ports. Each of the networks in $N_1$, $N_2$, $NG_1$, and $NG_2$ have more output ports than input ports so that if A is the total number of input ports in members of $N_1$ and $N_2$ that receive data from members of G; B is the total number of output ports of members of $N_1$ and $N_2$ that send data to G, C is the total number of input ports of members of $NG_1$ and $NG_2$; and D is the total number of output ports of members of $NG_1$ and $NG_2$; then $A<B=C<D$. This "fan out" property of the network greatly reduces network congestion thereby greatly reducing latency in the heavily loaded cases.

Another aspect of the disclosed embodiments is a hardware scheduling device that reserves lines between $N_1$ and $NG_1$ and also reserves lines between $N_2$ and $NG_2$. A processing unit in group G that requests a long message consisting of a plurality of long packets sends a message to the scheduling device to reserve a line from $N_1$ and $NG_1$ or to reserve a line from $N_2$ and $NG_2$.

Detailed Description

Multiple interconnect structures may be configured to transfer data in systems including but not limited to 1) routers (including internet protocol routers); 2) Ethernet switches; 3) ATM switches; 4) storage area network systems (SANS); 5) cluster computing systems and 6) supercomputers. Various methods may be used to schedule messages to pass through parallel switches, implement multicasting, implement error correction in various aspects of the systems, and employing extra system elements to replace elements that become defective.

The system 100 illustrated in FIG. 1A is a controlled communications interconnect structure utilizing two types of MLML networks. The system 150 illustrated in FIG. 1B (also utilizing two types of MLML networks) is a controlled interconnection structure used for computation and for data storage and management.

In the present disclosure, the term "line" refers to any data carrying transport medium including an electrical connection comprising a single metal connection, a bus comprising multiple electrical connections, an optical cable comprising one or more fibers carrying data in one or more wavelengths. Packets enter the system 100 through lines 102 into an input-output device 104 and then travel through line 106 to an input controller 108. In response to the arriving message packet, the input controller may submit a request to send the packet through a stack of data switches 130 and through an optional stack of auxiliary data switches 134 to a target output port. The input controller makes this request by sending a request packet through a request switch 111 to the request processor 114 that governs the flow into the output controller that is the target of the packet. In one embodiment the request switch 111 is a member of a stack of request switches 110.

Figure 1B:
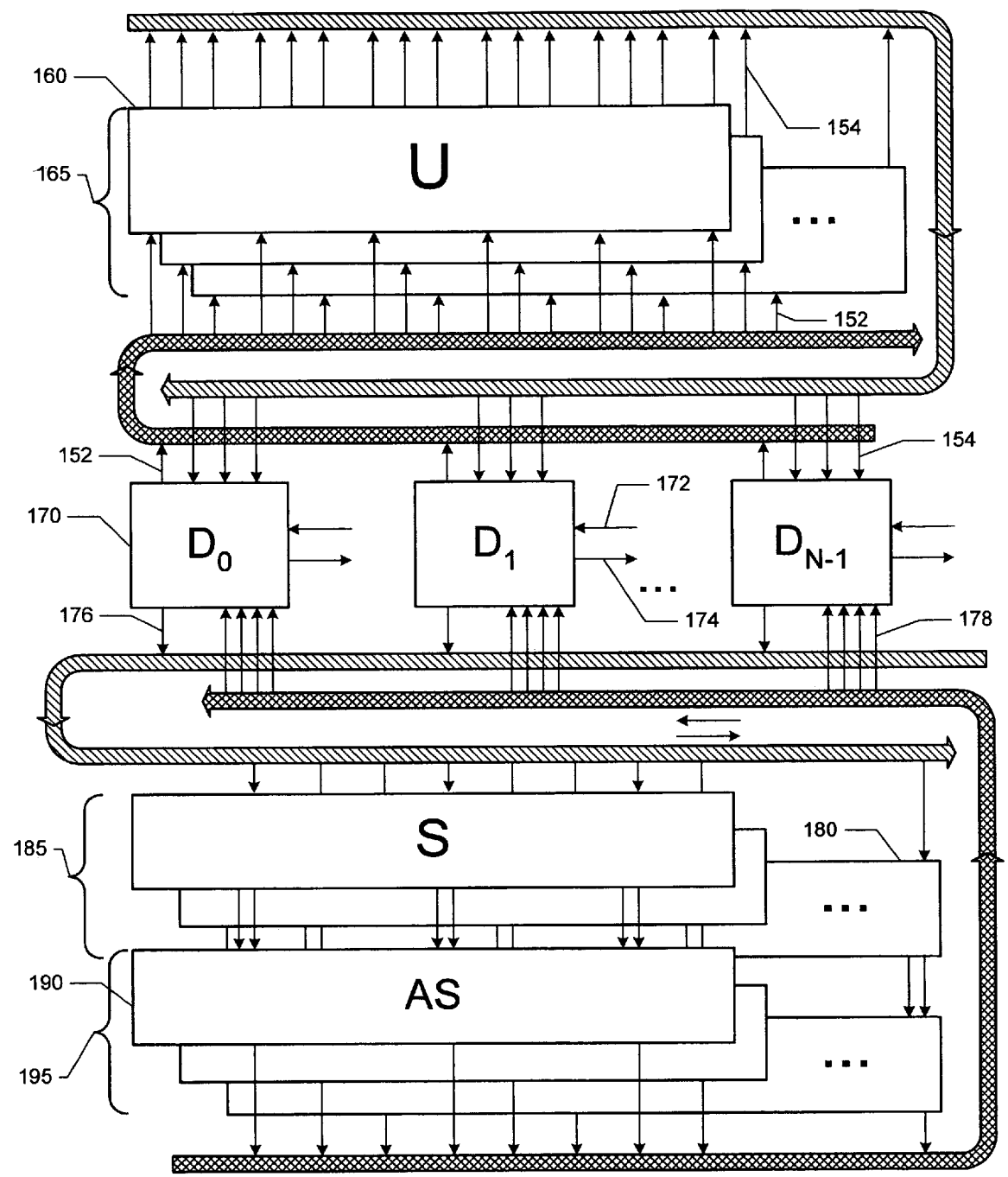
FIG. 1B illustrates an embodiment of a system for cluster computing and storage area networks which utilizes both a plurality of MLML Data Vortex networks and also a plurality of MLML stair-step interconnects.

Refer to FIG. 1B. Devices $D_0, D_1, \ldots, D_{N-1}$ 170 can be computational devices, data storage devices, or devices that store data and perform computation as well. A device $D_J$ requests data from device $D_K$ by sending a request packet that travels through line 152, then through the unscheduled Data Vortex switch 160, and then through line 154 to device $D_K$. In FIG. 1B, each device has one output line and multiple input lines. In another embodiment, a device may have multiple output lines 152 as well as multiple input lines 154. In many embodiments, the maximum bandwidth from the unscheduled network U into a device exceeds the maximum bandwidth from a device into the unscheduled network. System logic can schedule a precise time for the arrival of a packet into the devices 170 through the networks 180 and 190. In other embodiments, devices can send data through the switches at the next available sending time, for example the earliest time that: 1) the data is available at the sending device and 2) an available line 176 exists from the sending device to the switch 180). The device to receive the data keeps line 178 open and reserved for delivery of the incoming data. In some embodiments, the segments of a given data packet are decomposed into several sub-segments, with each sub-segment sent through a different switch 180. Moreover, additional switches 180 serve as spare replacement switches and also serve as carriers of error correction bits. Segments are sent through switch 180 in a parallel fashion.

Data Flow Control in a Communication Network System

FIG. 1A illustrates the communication network 100 utilizing Data Vortex switches RS 111 and MLML stair-step switches AS1 119 and AS2 131, with each AS2 switch comprising a plurality of crossbar switches. Because a request packet is relatively short, an entire request packet can be sent through a single switch in the switch-stack 110. Since multiple input controllers may simultaneously send request packets to the same request processor, an MLML switch of the Data Vortex type is highly suitable for usage as the request switch. In some instances, request packets may circulate around the Data Vortex before exiting.

The request processor 114 returns an answer packet to the requesting input controller 108. This is accomplished by sending the answer packet through an answer switch 119 (which may belong to a stack of answer switches 118) and possibly also through an optional secondary answer switch 123 (which may also belong to a stack of answer switches 122). A request packet contains a time stamp. If the request packet remains in the system for an amount of time exceeding a threshold, it is discarded.

In the illustrative embodiment, the input controller schedules an entire packet to pass through the data switches. The packet is segmented so that the data switches always send segments of the same length. Each segment of a packet may be further decomposed into sub-segments in order to send all of the sub-segments simultaneously through a plurality of data switches. For error correction purposes, one or more error correction sub-segments of length equal to the length of a sub-segment may also be sent through the data switch. In this manner, a segment and its associated error correction data packets are simultaneously sent through the data switches 131 in the data switch stack 130 and then through the optional auxiliary data switches 135 in the data switch stack 134. In one embodiment, the number NS of data switches in the stack is equal to the number of sub-segments plus the number of associated error correction sub-segments. In other embodiments, the number of data switches in the stack is greater than NS, and thus, a plurality of segments can simultaneously pass through the data switch stack 134.

Switch Output Designs in Communication Network Systems

Because the request packet is relatively short, the entire communications system request packet may be transmitted through a single MLML Data Vortex switch 111 of the stack of such switches 110 (FIG. 1A). The Data Vortex can also be used for the answer switches 119 of the stack of such switches 118. As illustrated in FIG. 2A, circular Data Vortex switches can be followed by on-chip output buffers 210 and then by off-chip output buffers 220. This construction enables usage of two levels of "leaky buckets". In this design, the auxiliary switches AS2 123 are not employed.

Figure 3A:
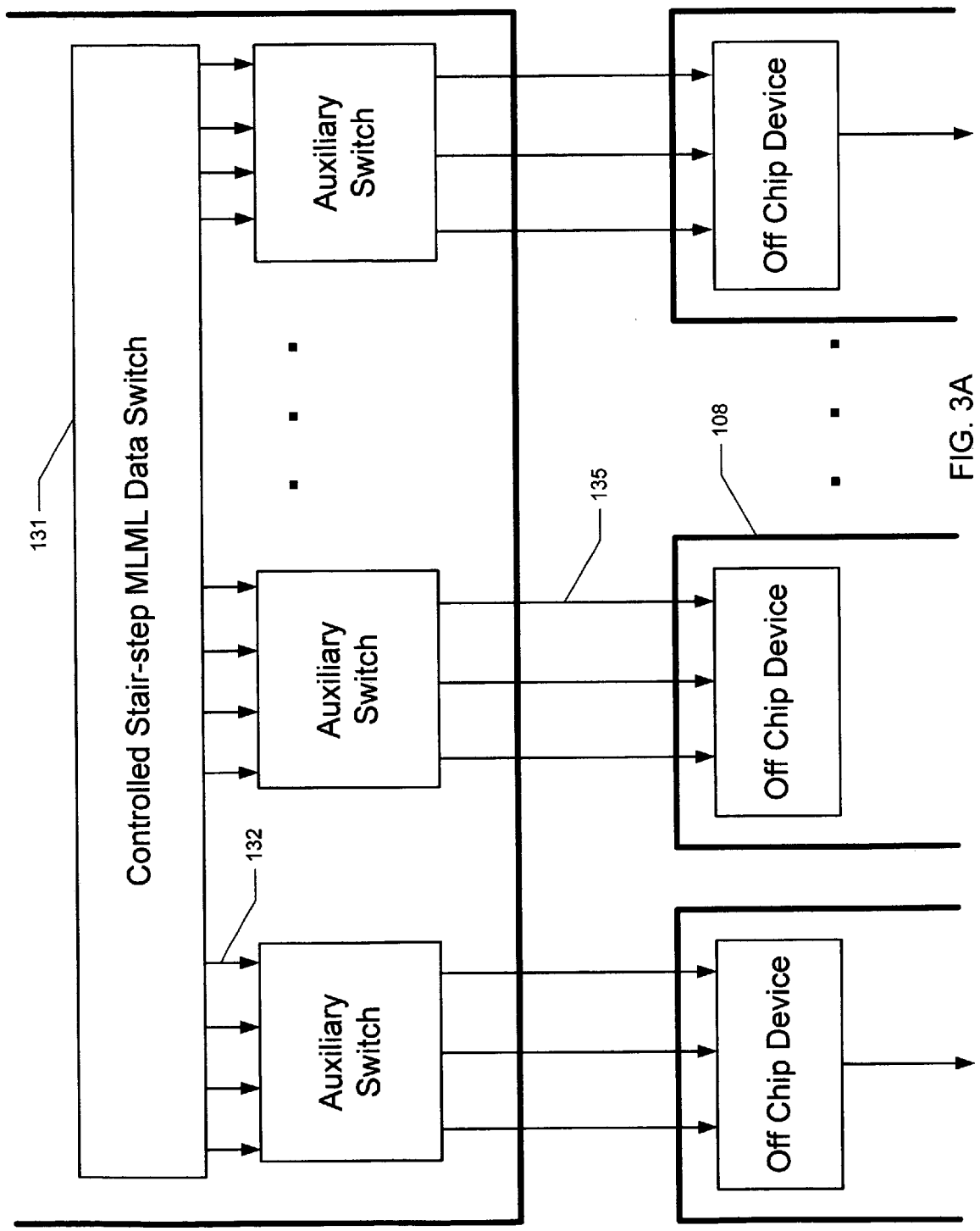
FIG. 3A illustrates the output portion of an MLML stair-step switch which contains auxiliary crossbar switches.
Figure 3B:
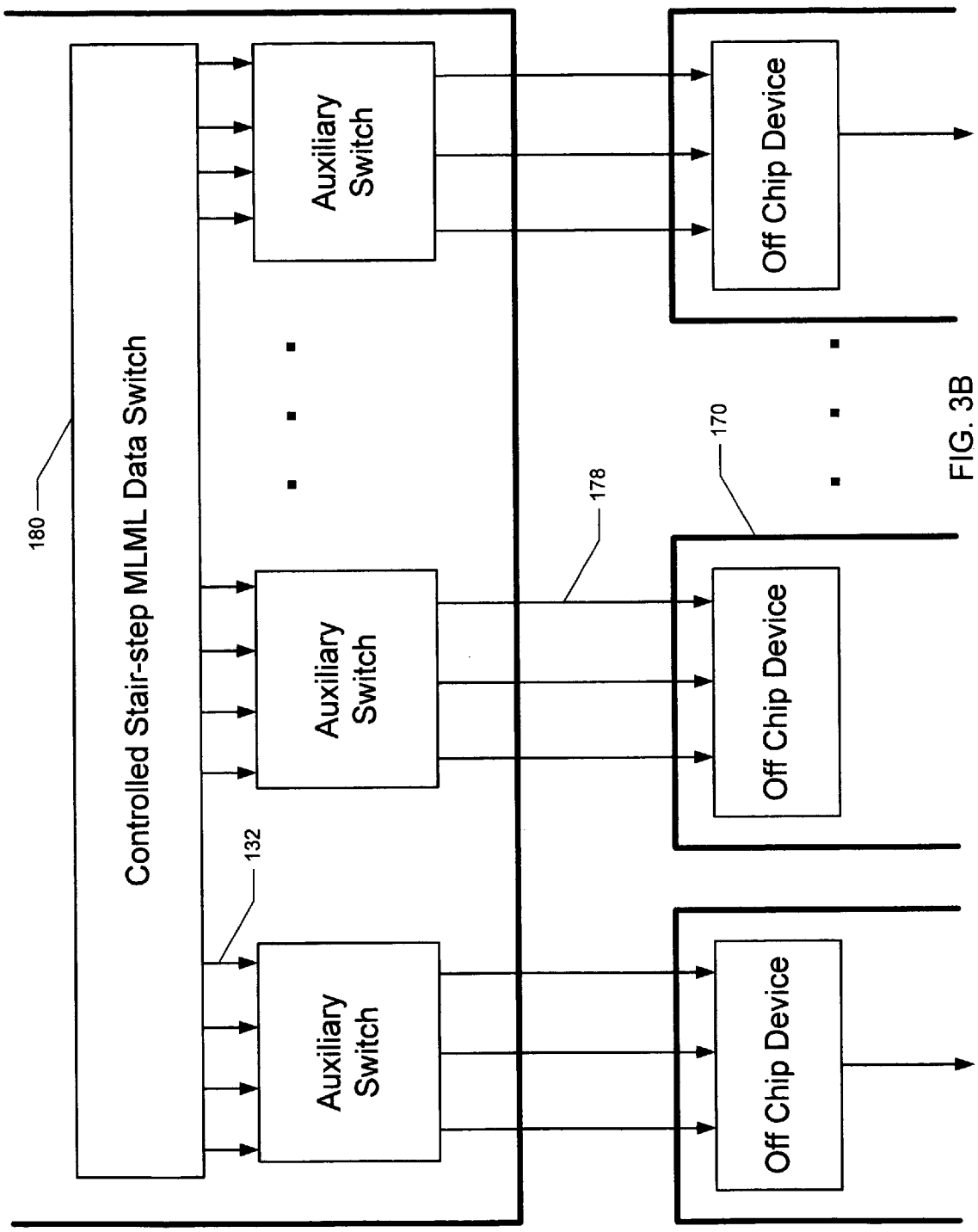
FIG. 3B illustrates the output portion of an MLML stair-step switch with auxiliary crossbar switches and multicast interconnections.
Figure 3C:
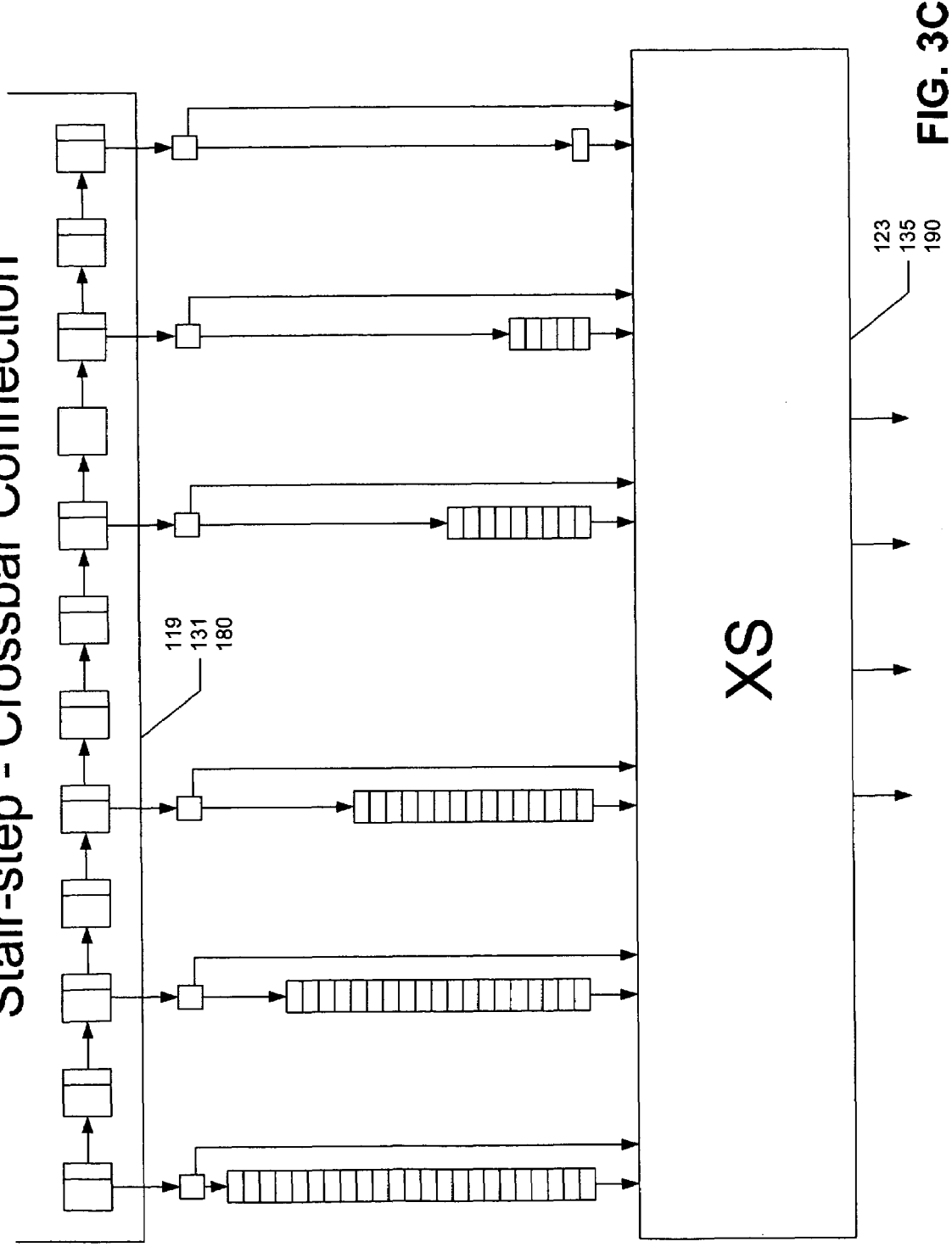
FIG. 3C illustrates an embodiment of a realignment and crossbar switch element connected to the bottom level of an MLML switch.

As illustrated in FIG. 3A, designs utilizing MLML stair-step switches for the answer switches AS1, may have the auxiliary switches AS2 on the same chip as the stair-step MLML answer switch. Since the auxiliary switches may have more input lines than output lines, the design reduces the pin count on the chip. FIFOs of various lengths are depicted, as illustrated in FIG. 3C placed between AS1 119 and AS2 123 switching units of FIG. 1A in order to maintain time alignment of the data at the output pins. The FIFOs are also used between DS1 131 and DS2 135 of FIG. 1A and between S 180 and AS 190 of FIG. 1B.

Because a data packet segment sent through a stair-step MLML switch is long compared to a segment sent through a Data Vortex switch, individual segments may be decomposed to be sent through the set of stair-step MLML switches 130 into sub-segments. For this discussion, each segment sent though the set of stair-step switches is decomposed into N sub-segments. At a segment-sending time determined by the request processor, the N sub-segments (which contain both data bits and their associated error correction bits) plus the additional error correction packet are sent simultaneously through the data switch stack 130 and then through the auxiliary data switch stack 134 (see FIG. 1A).

Refer to FIG. 3A. The switches DS1 and DS2 are located on the same chip for the same reason that AS1 and AS2 were placed on the same chip to reduce pin count). As before, FIFOs of various lengths (illustrated in FIG. 3C) are also used.

No buffers are needed or desired in the data switches. Because the flow of data through the data switches is controlled, the switches are never overloaded and correctly routed data is assured an immediate path off of the chip; therefore, the buffers are not needed. Buffers in the data switches are avoided and all sub-segments of a segment arrive simultaneously at the off chip device, where the segments can be corrected for errors and reassembled. In the configuration illustrated in FIG. 1A and FIG. 3A, all of the correctly routed sub-segments of a given segment are guaranteed to exit the switch stack 134 at the same time. Because there are no buffers, the misrouting of a sub-segment at a given time cannot cause the misrouting of another sub-segment at any other time. Moreover, the misrouting of a sub-segment cannot influence the time that another sub-segment exits the switch stack 134.

In the system illustrated in FIG. 1A, the request processors 114 make decisions to schedule packets based on information concerning other packets presently being scheduled as well as packets that have been scheduled in the past. The request processors evaluate packet priority in making scheduling decisions. The packet priority is based in part on quality of service. The packets in the output buffers have arrived at various times, and the decision to discard a packet P in an output buffer is based in part on information concerning packets arriving at system 100 after the arrival of P.

Data Flow Control in a Computing and Data Management Network System

FIG. 1B illustrates the communication network 150 utilizing Data Vortex switches U 160 and MLML stair-step switches S 180. The switch U carries short packets, and therefore, the packet can be sent through a single switch 160 in the stack of uncontrolled switches 165. The short packets include request packets, acknowledgement packets or short data packets. Since multiple devices may simultaneously send short packets to the same device, an MLML switch of the Data Vortex type is highly suitable for usage as the switch U. Request packets may circulate completely around the Data Vortex before exiting. The switch U can be used to carry messages comprising several short packets, and therefore, in order to keep the packets in sequence, it is desirable that the switch U be a self-regulating switch of the type described in incorporated reference No. 13. A device that requests data to be sent through the switch S can designate in the request packet which of its input lines 178 are reserved for the requested data. In this case, the requesting device holds that port open until the data arrives (or in one embodiment until a pre-determined time out value is reached). While the switch S 180 directs data to the requested output device, the auxiliary switch AS 190 is responsible for delivering the data to the proper device input line. As soon as data in the form of one or more packets begins to arrive on a given input line of a device $D_J$, the device can calculate the time of arrival of the last packet of the data set. Therefore, the device can request that data from another device be sent so that the first bit of the new request arrives immediately after the last bit of the data in the present incoming packet has arrived. A feature of scheduled MLML stair-step switches S is that the arrival time of the last bit is known, even in the case that the data is being sent in multiple packets. In a system where the latency of a request packet through switch U does not exceed the last bit latency of the shortest packet sent through S and AS, the system can be kept at maximum performance at all times.

Figure 2B:
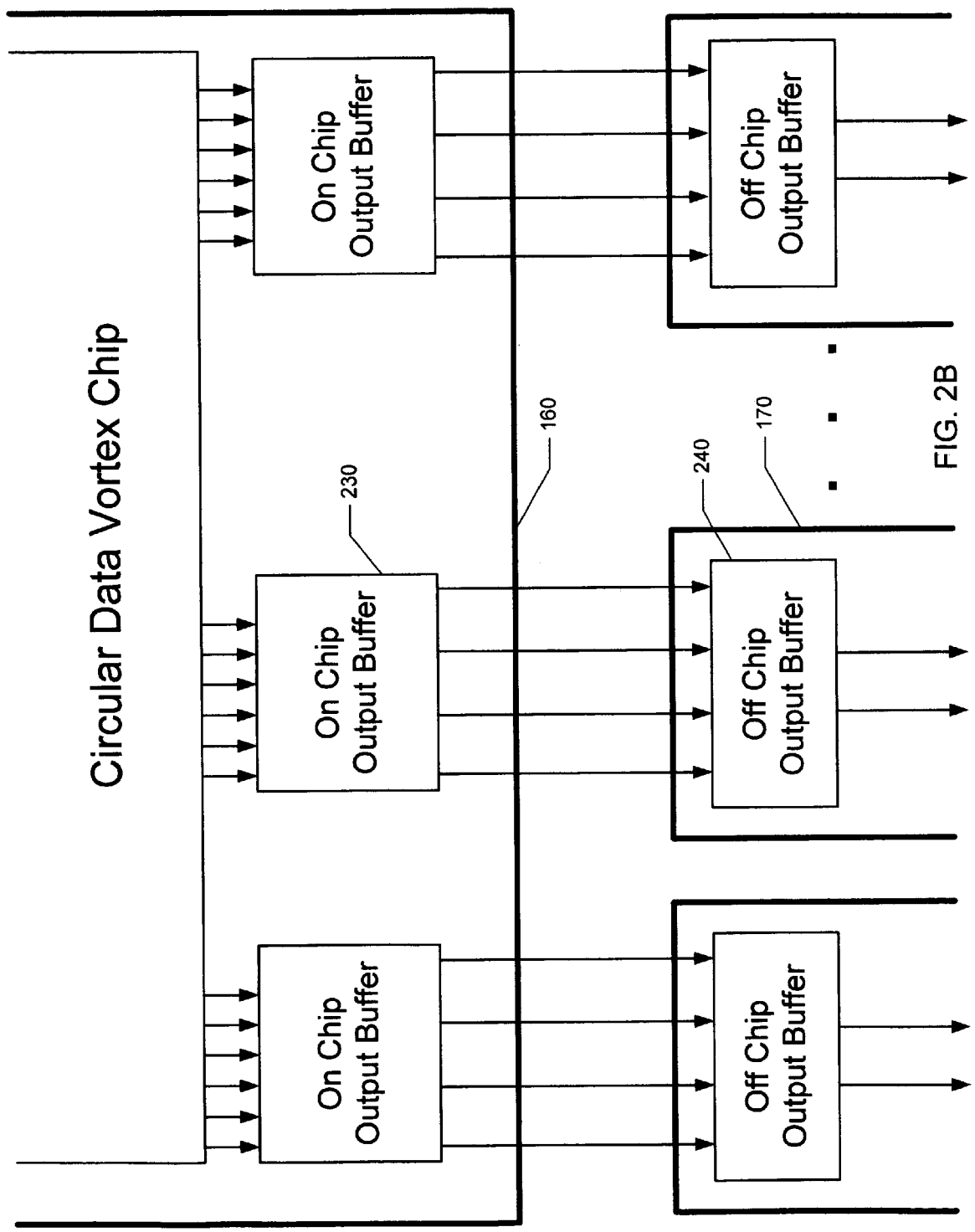
FIG. 2B illustrates the output section of an MLML Data Vortex switch employing on-chip buffers on the uncontrolled switch in a computing and data storage system.

The system 150 contains multiple devices D 170 that may be of the same type or may differ in construction and function. The function of a given device 170 may be: 1) to compute; 2) to store and retrieve data; or 3) to compute as well as store and retrieve data. The devices receive data from outside of system 150 through lines 172 and send data out of the system via lines 174. In one embodiment, the devices 170 are themselves systems of the type illustrated in FIG. 1B. Such complex systems of this type also communicate with each other via interconnection lines and via switches U 160, S 180, and AS 190. The switch U is ideally an MLML Data Vortex. A device 170 can insert data into U without asking for permission to do so. Since multiple devices may send data through U to the same target device T, the volume of data into T may exceed the bandwidth into T through lines 154. Referring to FIG. 2B, buffers 230 can be configured to receive output from the Data Vortex switch and to have input buffers 240 incorporated into the computational and data storage devices 170. The techniques described in incorporated reference No. 13 entitled "Means and Apparatus for a Self-Regulating Interconnect Structure" to regulate the flow of data through the MLML Data Vortex switch 160.

As discussed in the incorporated references No. 11 and No. 14, the packets passing through switches S 180 in the stack of such switches 185 are scheduled so that overloads are prevented, and therefore, an MLML switch of the stair-step type is highly suitable for usage as each switch S in the stack. The switches AS 190 can be built using a plurality of crossbar switches. Data can be passed through the switches using sub-segmentation.

In general, requests made by one device $D_A$ to a second device $D_B$ via the unscheduled switch U may be classified into two types: "non-negotiated" requests and "negotiated" requests. In a simple non-negotiated request, $D_A$ sends a small request packet to $D_B$ requesting that $D_B$ send an information packet (comprising one or more segments) back to $D_A$ via a specified input line into to $D_A$. No reply is sent by $D_B$, and $D_A$ reserves the specified input line L from a time beginning at T (included in the request packet) until the requested information packet is received from $D_B$. In one embodiment, the header of first segment sent by $D_B$ contains information that specifies the total number of segments NS in the information packet. Thus, $D_A$ can maximize its use of the reserved line L by making an additional request that uses L to a third device $D_C$ while data is streaming in from $D_B$, provided that additional data does not arrive on L until after the last segment of the first request has been received. A time limit TLIM known by both devices is useful so that if $D_B$ is unable to send the requested information without violating TLIM, $D_A$ knows that the information is not be sent, and thus is able to free the reserved line for other usage. In case of a denial, $D_A$ may request the data again at a later time, if appropriate.

In a second type of non-negotiated request a reply mechanism is used. When $D_B$ receives a request for information from $D_A$, $D_B$ returns a small information packet informing $D_A$ of the time that the first data segment is sent and the number of segments in the requested information packet. With this information, $D_A$ is able to make additional use of the reserved line L, for example, $D_A$ may be able to schedule the use of L in the time before the first segment arrives from $D_B$ as well as in the time immediately following the last segment coming from $D_B$. Another use of the reply packet could be to inform $D_A$ that the information is unavailable, for example, $D_B$ does not have the requested data or cannot send the requested data within the constraints of the established time limit.

Another type of non-negotiated request involves $D_A$ requesting $D_B$ to receive data from $D_A$ (or from some other device or devices) rather than send data to $D_A$ (or to some other device or devices). The request to send informs $D_B$ of the number of segments to be sent and the earliest time T at which $D_A$ can begin sending the first segment. $D_A$ reserves one of its output lines for sending the data and waits for a reply. Upon receiving the request, $D_B$ determines when it will be ready to receive the data and sends a reply packet to $D_A$. The packet informs $D_A$ of the time that $D_B$ is ready to receive the first segment of data and the input line that will be reserved for receiving the data. If $D_B$ cannot receive the data before an established time limit expires, it so informs $D_A$ in the reply packet. Upon receiving a positive reply to send the data, $D_A$ begins sending the data segments to $D_B$ at the time and to the input line specified in the reply packet.

In a negotiated request two or more devices exchange request packets until each agrees on a mutually acceptable time for sending the requested data through the scheduled switch S. (Note: The unscheduled switch U may be used for sending data as well as request packets, provided that the requested data is "small", for example less than a predetermined system-wide parameter.) For example, device $D_A$ sends a request packet to device $D_B$ requesting an information packet. In the request $D_A$ includes an input line and a set of times that it has available for receiving the requested data segments. Upon receiving the request packet, device $D_B$ selects one of the times suggested by $D_A$ and returns it in a reply packet to $D_A$ along with additional information, such as the number of segments in the requested data. At the mutually agreed upon time, $D_B$ begins sending the requested segments to $D_A$ specifying the reserved input line. If appropriate, $D_B$ may deny the request for data for the reasons previously discussed.

In another example of a negotiated request, a device $D_A$ may request that data from two other devices $D_B$ and $D_C$ be delivered to it in a synchronous manner so that $D_A$ can perform a function on the two arriving data streams. To do so $D_A$ requests a set of times acceptable to $D_B$ and also a set of times acceptable to $D_C$. From information received, $D_A$ selects a time agreeable to all three devices, reserves input lines for the data, and informs devices $D_B$ and $D_C$ of the time and input line to use for sending its data. The process can be extended to the condition when a single device requests data from three or more other devices simultaneously. A single system 150 can operate using both "negotiated" (data arrives at a specific pre-assigned time) and "non-negotiated" (data arrives in pre-assigned time window) requests.

Switch Output Designs for Computing and Data Storage

Refer to system 150 of FIG. 1B. Such a system is useful many applications, including cluster computing and mainframe computing. Unlike the system 100 illustrated in FIG. 1A, system 150 does not discard packets.

The system 150 contains a plurality of devices 170 that may be of the same type or may differ in construction and function. The function of a given device 170 may be to compute, to store and retrieve data, or to compute as well as store and retrieve data. The devices receive data from outside of system 150 through lines 172 and send data out of the system via lines 174. Devices 170 communicate with each other via interconnection lines and via switches U 160, S 180, and AS 190. The switch U is ideally an MLML Data Vortex. A device 170 can insert data into U without asking for permission to do so. Since multiple devices may send data through U to the same target device T, the volume of data into T may exceed the bandwidth into T through lines 154. Therefore (referring to FIG. 2B), it is useful to have on-chip buffers 230 to receive output from the Data Vortex switch U 160 and to have input buffers 240 incorporated into the computational and data storage devices D 170. It may also be useful to utilize the techniques described in incorporated reference No. 13 entitled "Means and Apparatus for a Self-Regulating Interconnect Structure" in order to regulate the flow of data through the MLML Data Vortex switch 160.

As discussed in the incorporated references No. 11 and No. 14, the packets passing through switches S 180 in the stack of such switches 185 are scheduled so that overloads are prevented, and therefore, it is highly appropriate for switch S to be an MLML switch of the stair-step type. The switches AS 190 can be built using a plurality of crossbar switches. Data can be passed through the switches using sub-segmentation as previously described. The incorporation of both S and AS on a single chip is illustrated in FIG. 3A. Using stair-step switches in the systems can prevent misrouted fro adversely affect data inserted into the data switches at a later time. The illustrative methods enable correction of misrouted data at packet reassembly time.

Error Correction

Figure 5A:
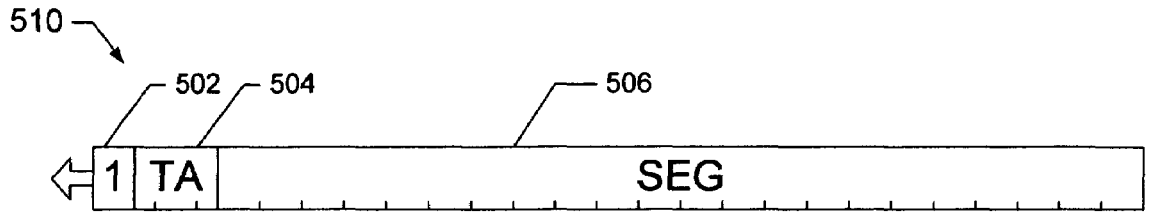
FIG. 5A illustrates the format used to send an entire data segment through a single MLML data switch.
Figure 5B:
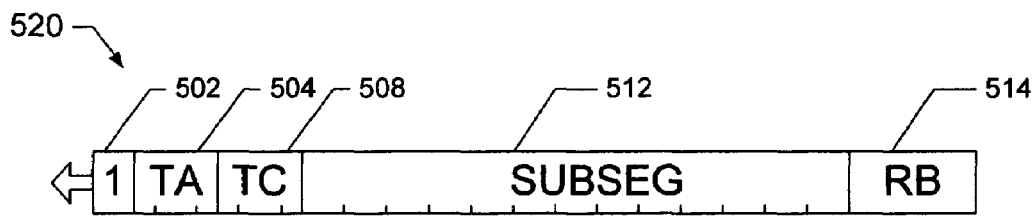
FIG. 5B illustrates the format of a modified data sub-segment with a copy of the target address and an error correction bit added.
Figure 5C:
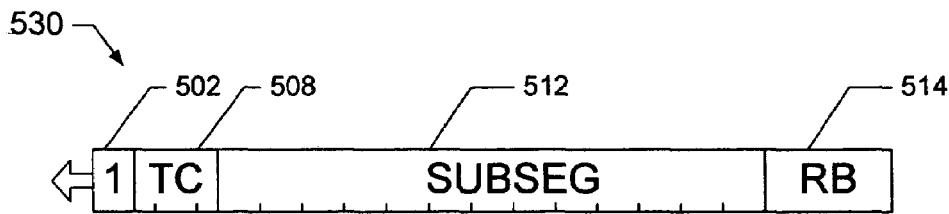
FIG. 5C illustrates the structure of a data sub-segment after it has passed through the switch system and the lead address bits have been removed.
Figure 5D:
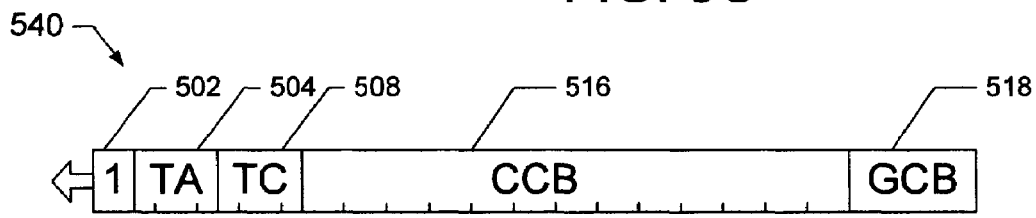
FIG. 5D illustrates the structure of a check bit packet before entering a switch.
Figure 5E:
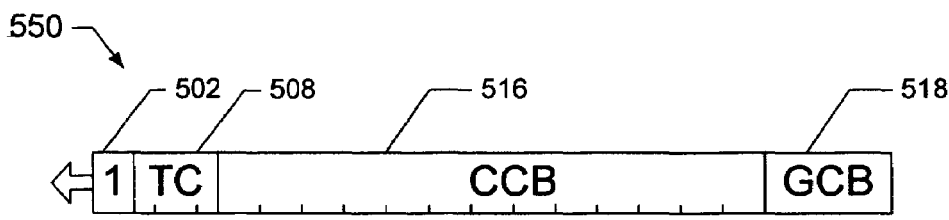
FIG. 5E illustrates the structure of a check bit packet after exiting the switch and the lead address bits have been removed.
Figure 6A:
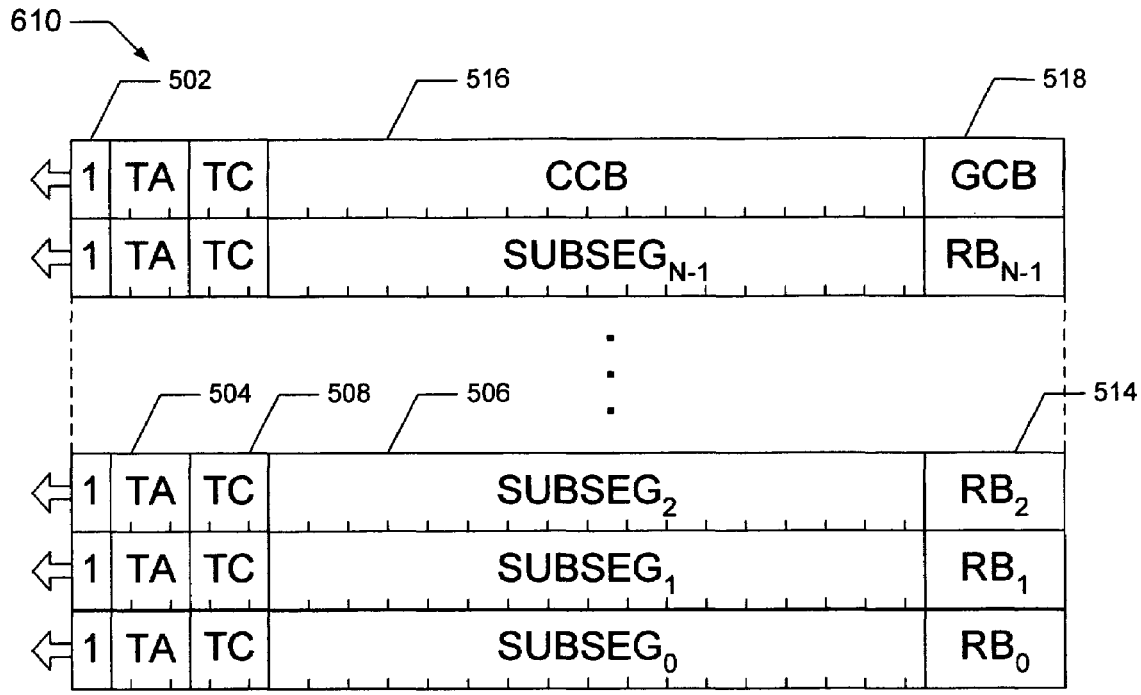
FIG. 6A illustrates an embodiment of a stack of sub-segment packets and their error correction packet ready for sending into a stack of MLML switches.
Figure 6B:
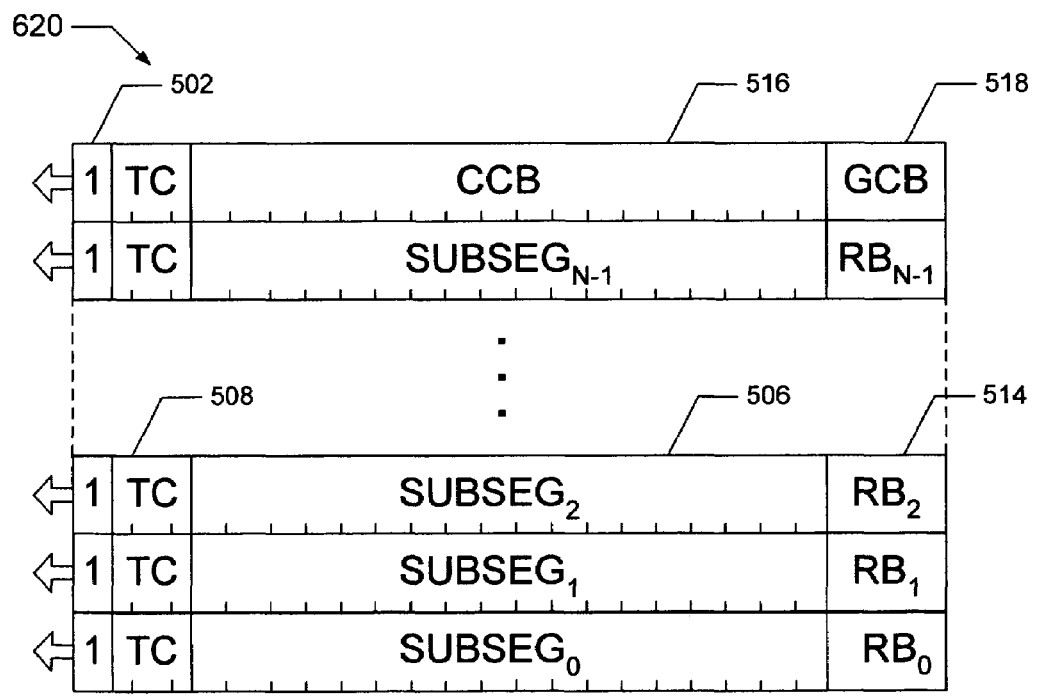
FIG. 6B illustrates an embodiment of a stack of sub-segment packets and their error correction packet after they have been processed by a stack of MLML switches.
Figure 6C:
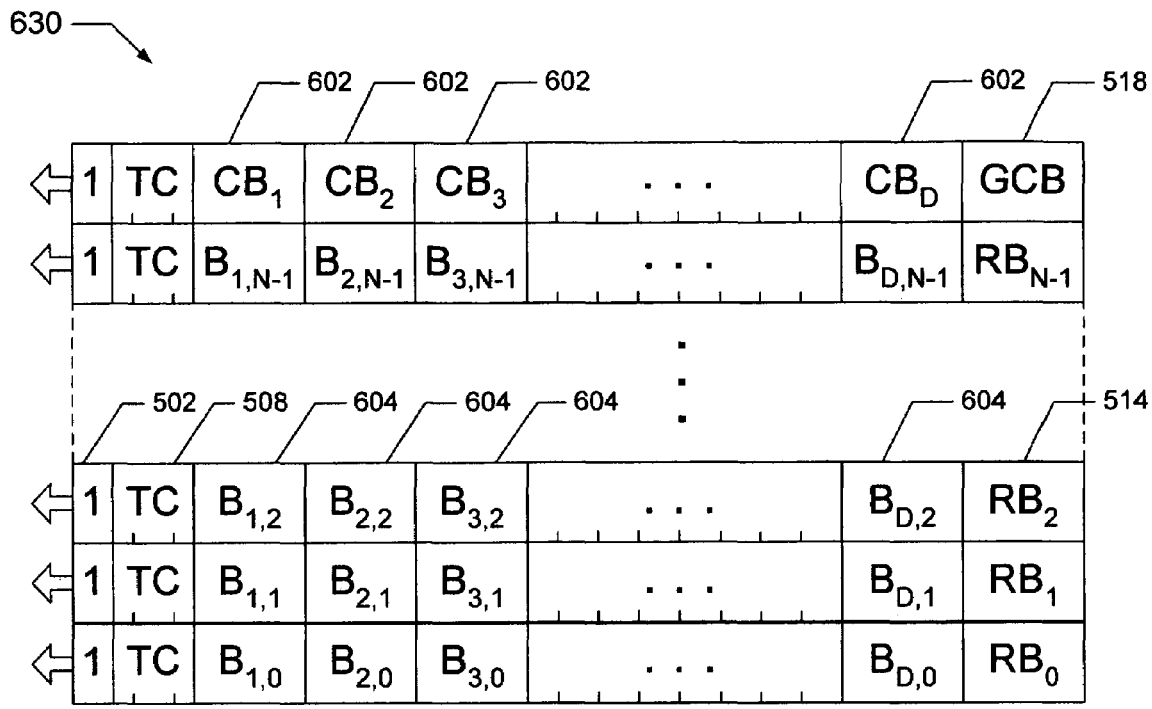
FIG. 6C illustrates the structure in FIG. 6B with the sub-segment payload fields and the correction packet check bit field replaced by the individual bits that compose them.

FIGS. 5A, 5B, 5C, 5D, and 5E, along with FIGS. 6A, 6B, and 6C, are used to illustrate a method of error correction used when a packet segment is sub-segmented and then all of the resulting sub-segments are simultaneously sent through a stack of MLML data switches of the stair-step construction. When a message packet enters the switching system 100 or 150, it is decomposed into a set of segments, each having the same length (padding may be used in the last segment). In order to send a segment through an MLML switch, it would need to be encapsulated into a segment having the format illustrated 510 having the minimal form illustrated in FIG. 5A, where the first bit 502 is an existence bit equal to 1, TA 504 is a target output port address of length T, and SEG 506 is the segment data. Instead, however, each segment is further decomposed into a set of N sub-segments (numbered 0 through N−1), each having the same length D (padding of the last sub-segments may be appropriate). Each of the N sub-segments is encapsulated into a sub-segment 520 as illustrated in FIG. 5B. As before, the first bit 502 is an existence bit equal to 1 and TA 504 is the target output port address.

The next field TC 508 is a copy of the target output port address, and the field SUBSEG 512 is the sub-segment data. The last field RB 514 is a check bit (parity bit) equal to the mod 2 sum of the D bits in SUBSEG 512.

One additional sub-segment is associated with each set of N sub-segments and is used for error correction purposes. This $N+1^{st}$ sub-segment 540 has the same length as the sub-segments 520. As before, the first field 502 is an existence bit equal to 1, the second field 504 is the target output port address, and the third field TC 508 is a copy of the target output port address. The remaining D+1 bits include D "column" check bits CCB 516 and a "global" check bit GCB 518. If the N sub-segments 520 and the error correction sub-segment 540 are stacked on top of each other with sub-segment number 0 forming the bottom row, sub-segment number 1 forming the next higher row, etc., and the correction sub-segment 540 forming the top row, then an N+1 row structure is formed as illustrated in FIG. 6A. With this picture in mind, the field RB 514 may be called a "row" check bit for SUBSEG 512. Each bit B of CCB 516 sits on top of a column of N bits, one from each of the sub-segments (illustrated in FIG. 6C). B is defined to be the mod 2 sum of the N bits, and thus, B may be termed a "column" check bit. GCB 518 sits on top of a column of N row check bits RB 514 and is defined to be the mod 2 sum of the bits, and thus, is a column check bit for the row check bits. Note that GCB is also the mod 2 sum of the bits in CCB, and thus, is a row check bit for CCB. Moreover, GCB is the mod 2 sum of the D·N bits for all of the sub-segments 512. Thus, GCB is called the "global" check bit for this set of sub-segments.

Figure 6D:
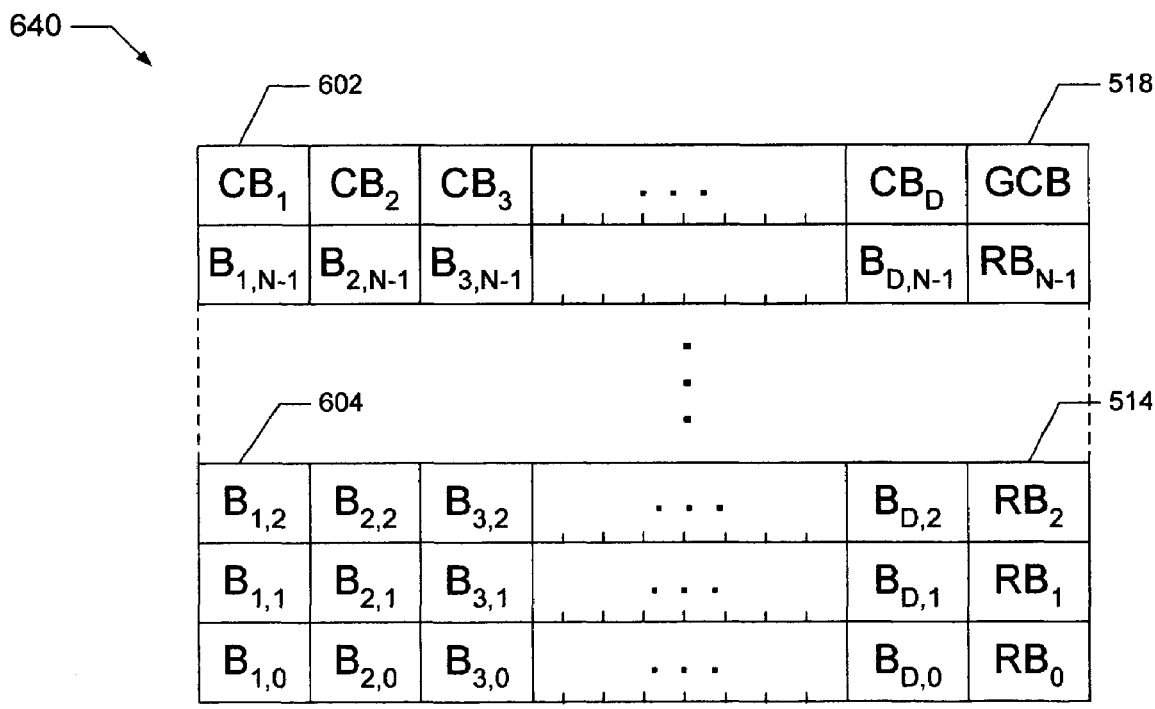
FIG. 6D illustrates an embodiment of a matrix of data and check bits used for error detection and correction.
Figure 6E:
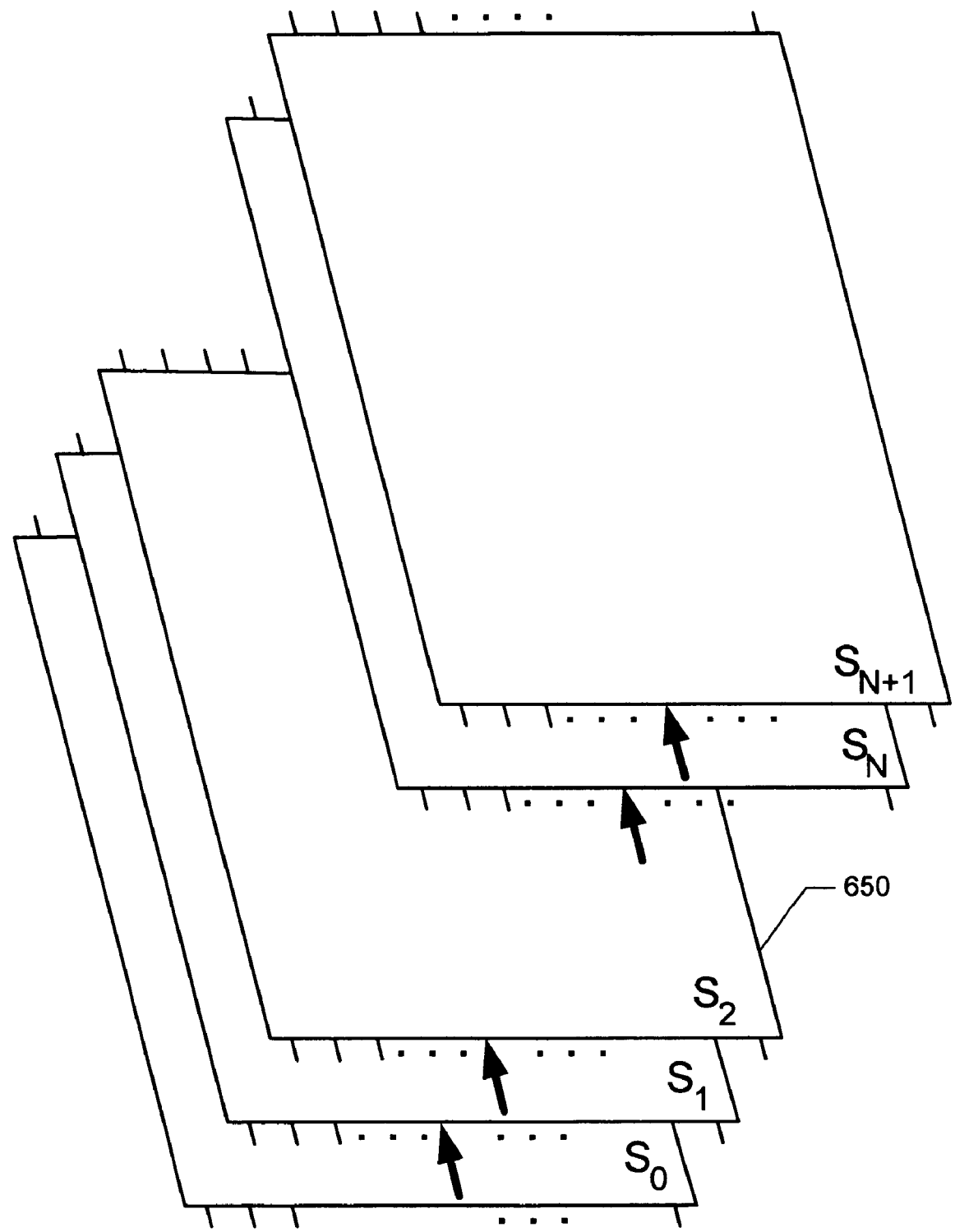

The N+1 sub-segments 610 pass through a stack of N+1 MLML switches 650 as illustrated in FIG. 6E. In FIG. 6E, the N+1 sub-segments enter the switches 1 through N+1 and additional switch is employed as a replacement switch as discussed in the next section. In FIG. 6E, each of the segments enters input port 652. As this set of N+1 sub-segments 610 passes through a stack of MLML switches, the bits of TA 504 that designate the target output port of the MLML switch are stripped off, leaving the bits of of TA used to route segment through the auxiliary switch. The sub-segments then pass through the alignment FIFOs and the auxiliary switch, finally exiting the switch chip. In communication systems, they enter the input buffer of an input controller, where error correction occurs. In computing systems, they enter the input buffer of a computing or data storage unit, where error correction occurs. They arrive at the desired input port buffers as a set of sub-segments 620 as illustrated in FIG. 6B. FIG. 6C is equivalent to FIG. 6B and replaces the multi-bit fields SUBSEG and CCB with the bits that compose them. FIG. 6D is the same as FIG. 6C with the existence and address bits removed. Thus, SUBSEG N is composed of bits 604 $B_{1,N}, B_{2,N}, \ldots, B_{D,N}$ and CCB is composed of bits 602 $CB_1, CB_2, \ldots, CB_D$. Four types of errors can be detected using the structures illustrated in FIGS. 6C and 6D: 1) An "address error" is indicated if for some row, the existence bit 502 is not 1 or the copy of the output port address TC 508 is not equal to the actual output port; 2) A "row error" is indicated if for one of the N+1 rows in FIG. 6D, the mod 2 sum of all the bits in that row (including the check bit RB or GCB) is equal to 1; and 3) A "column error" is indicated if for one of the D+1 columns in FIG. 6D, the mod 2 sum of the bits in that column (including its check bit CB or GCB) is equal to 1; and 4) A "payload error" is indicated if the mod 2 sum of GCB and the N·D payload bits for the N SUBSEGs 512 is equal to 1. Any one-bit error in the sub-segment payload data can be located and corrected. Multi-bit errors in the payload data caused by a single misdirected sub-segment can also be corrected. A process to do so follows.

1) For a single row error on row y and a single column error on column x, then the bit located at (column x, row y) is in error and can be easily corrected. If x=D+1, then the designated bit is a row check bit RB. Likewise, if y=N+1, then the designated bit is a column check bit CB. In the special case that x=D+1 and y=N+1, then the designated bit is GCB, which is both a row check bit and a column check bit. When an error occurs in a check bit, it need not be corrected; only errors in the sub-segment payload data are corrected.

2) For a condition of no row errors and one or more column errors, then the copies of the target output addresses TC are examined to determine whether an address error has occurred. In the case of a single address error on row y, then the data on row y comes from a misdirected sub-segment, for example, a sub-segment whose target output port address TA had a bit error causing it be sent to the wrong output port. The correct sub-segment data SUBSEG for row y can be reconstructed using data from the other sub-segments (not on row y) and check bits of CCB from the correction sub-segment.

3) If errors are detected other than errors described in 1) and 2) (for example two row errors and two column errors; no row errors, multiple column errors, and multiple address errors; etc), then two or more bits are in error and the errors involve more than one sub-segment. Such errors are beyond the scope of this process.

4) If no row errors or column errors occur, then all sub-segment payload data is correct or more than two bits are in error and the errors cannot be detected by the process (for example four bits in error are aligned into a square, thus canceling both row and column errors).

The present section discusses one method of single error detection and correction along with double error detection in both the payload section and the header section of a sub-segment. Other schemes may be devised for correcting additional errors in compliance with the disclosed techniques.

Automatic Repair

In a system illustrated in FIG. 1A or FIG. 1B, the payload of a given segment is placed into N separate sub-segments. Additionally, a sub-segment including error correction bits is constructed. In systems of the type which enable automatic repair, a total of N+2 switches are included in the stack of stair-step switches. N of the switches carry sub-segments; one of the switches carries the sub-segment of check bits, and one of the switches does not carry data and is reserved as a spare. In case a defect occurs in any one of the N+1 information carrying switches, the resulting errors are detected by the hardware that does error correction. If it is determined that the detected errors are all produced by a single switch, this result can be reported to a central hardware repair device (not pictured) which can automatically swap out the defective switch and replace it with the spare switch. This process can be a "hot swap".

Multi-Casting

Figure 3D:
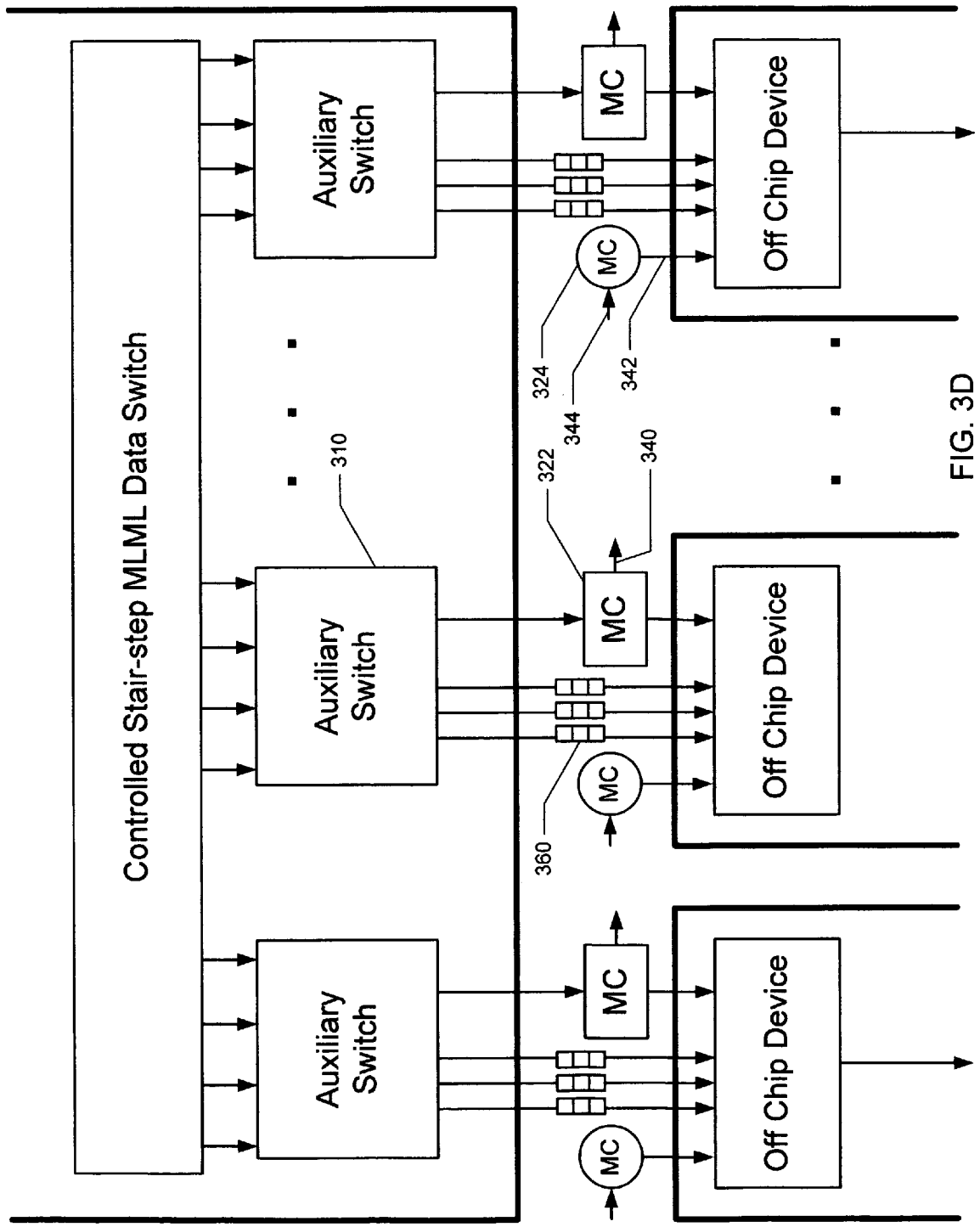
Figure 4:
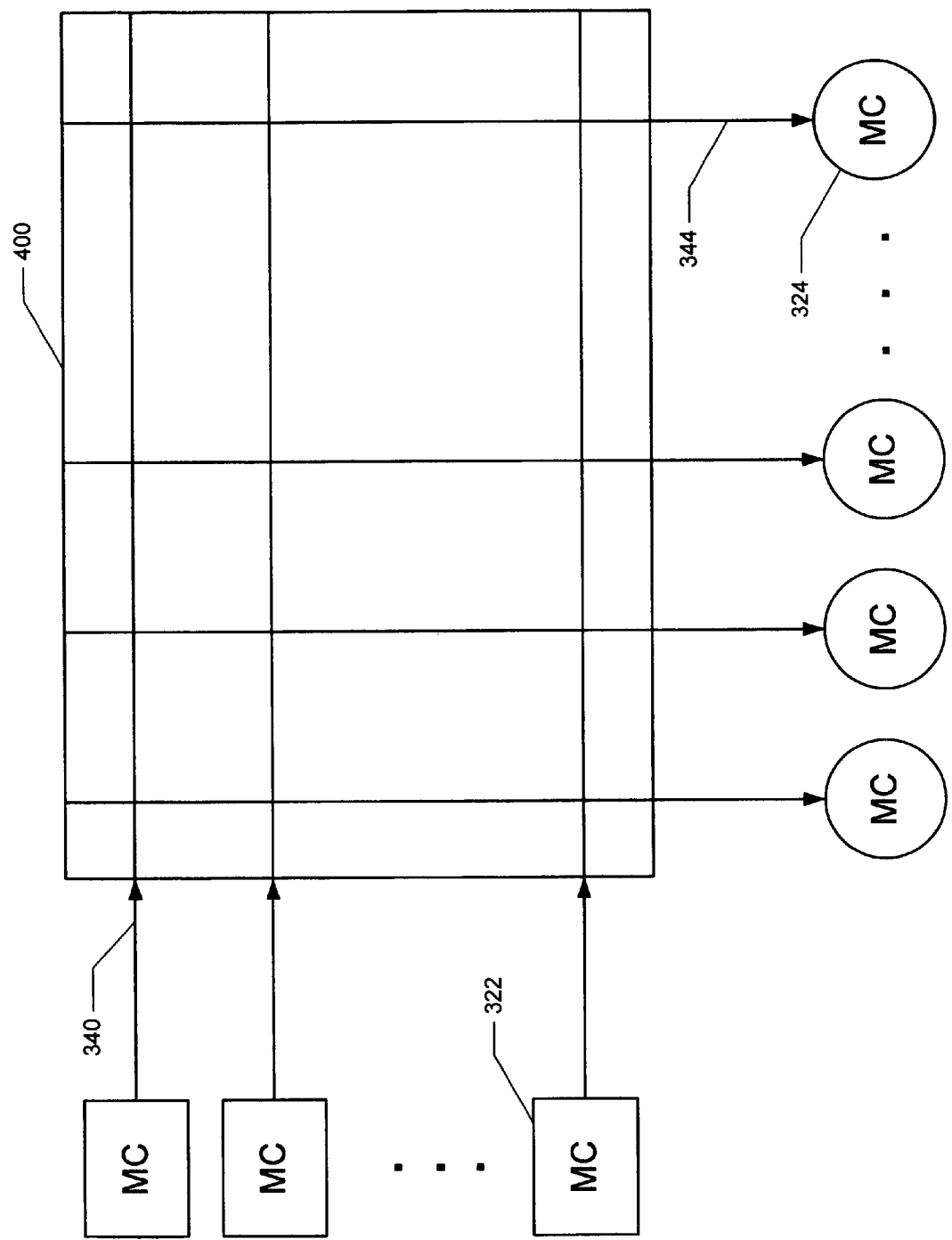
FIG. 4 illustrates the multicast system.

Refer to FIG. 3D illustrating the connections to and from the multi-cast switch 400, which is illustrated in FIG. 4. The stair-step and the auxiliary switch illustrated in FIG. 3D represent the switches DS1 and DS2 of FIG. 1A and may also represent the switches S and AS of FIG. 1B. In one simple embodiment taught here, group G denotes the set of devices that receive data from the auxiliary switch and $E_1, E_2, \ldots, E_J$ are mutually exclusive subsets of G. Associated with each set of devices $E_N$, a unique device $MC_N$ (composed of a sending unit 322 and a receiving unit 324 in the illustration) is responsible for handling data that is to be multicast to the set of devices in $E_N$. Sub-segments that are to be multicast to the devices in set $E_N$ are sent to $MC_N$ unit 322 via the auxiliary switch 310 that connects to $MC_N$. To indicate that the packet is to be multicast, a bit is set to 1 in a predetermined location in each of the sub-segments of the packet segment. One suitable location for such a multi-cast bit is between the bit fields TA and TC of FIG. 5B. When the multicast bit is set to 0, $MC_N$ sends the sub-segments of the message through line 342. When the multicast bit is set to 1, the sub-segments are sent through line 340 to the crossbar switch 400 illustrated in FIG. 4. The crossbar switch is set so that the message from $MC_N$ is sent out all of the lines 344 connected to receiving units MC 324 of members of $E_N$. Note that multiple devices MC may multicast messages simultaneously by independently setting nodes on the crossbar switch since the sets in group G are mutually exclusive. The FIFOs 360 delay non-multicast sub-segments so that all data enters the off-chip devices 348 at the same time.

Error correction for non-multicast data and multicast data is handled in the same way. The device DV 348 that receives data from $MC_N$ unit 324 on line 346 holds that line into $MC_N$ open until the entire multicast message has been received. Holding open this line is typically arranged either through the request processors associated with DV in FIG. 1A or through the receiving device DV in FIG. 1B.

In some applications, one or more of the devices in the set $E_N$ are unable to accommodate the multicast data at the time that received. If so, it is useful to have the device sending the multicast message to keep a copy of the message, and also have the devices receiving a multicast segment send an acknowledgment or non-acknowledgement. Thus, the segment can be re-sent to those devices that could not originally accept the message. In a second embodiment, the multicast segment is sent only after it is ascertained that all devices in $E_N$ are prepared to receive the message. In this second embodiment, it may be useful to replicate the multicast hardware in the portion of the system that carries request packets. Other methods of utilizing the multicast hardware may be implemented.

Increased Port Count Switches

The number of ports that a single switch on a chip can support is limited by the number of pins in the chip package. To build systems supporting more hosts than the pins on a single chip allow, multiple chips can be used. In a simple embodiment, each host may have more than one input port. A package enables the number of input ports plus the number of output ports to equal S. In a system containing $(2/3) \cdot S$ hosts that enables each host to send data to any other host, one can use two switches, with each switch having $(1/3) \cdot S$ inputs and $(2/3) \cdot S$ outputs. In such a system, each host has one output port for sending data into one of the two switches and two input ports for receiving data, one from each of the two switches. Thus, each host can send data to only one of the switches, but can receive data from either switch.

The technique taught above is useful for making a 512× 512 switch using two chips, each with 800 ports. Using this method, a given host X can simultaneously receive messages from two other hosts U and V, but there exist hosts A and B such that X can receive a message from A and X can receive a message from B, but X can not simultaneously receive messages from both A and B. This situation is true if the inputs from U and V are connected to different switches, while the inputs from A and B connect to the same switch.

The technique taught in this section may be used to increase the number of hosts supported for a given pin count in systems where each data packet passes through a single chip. To square the number of hosts supported for a given pin count, systems are employed in which a portion of the data passes through banks of multiple switching chips. Systems of this type are described in the following section.

Building Blocks for Constructing Big Switches

Incorporated reference No. 2 teaches a method of using multiple N×N Data Vortex networks to create networks with increased port count. In one embodiment, $2 \cdot N$ such networks are used to create an $N^2 \times N^2$ network. The disclosed embodiments are a variant of the N×N Data Vortex™ architecture constructed of "blocks" or "building blocks" of switches where each such building block network comprises a single switch or stack of switches with each switch in the stack being either: 1) A circular Data Vortex; 2) A stair-step MLML switch; 3) an increased port count Data Vortex chip described in the previous section or 4) an increased port count MLML stair-step. In systems taught here, each of the switches has N input ports and N output addresses where a given output may support multiple output lines. A switch block is used for carrying multiple sub-segments, carrying check bits, and acting as a reserve chip for automatic repair. In embodiments where the building blocks carry sub-segments in parallel, the input and output lines comprise busses.

A Multi-Hop, Uncontrolled Data Vortex

Figure 7A:
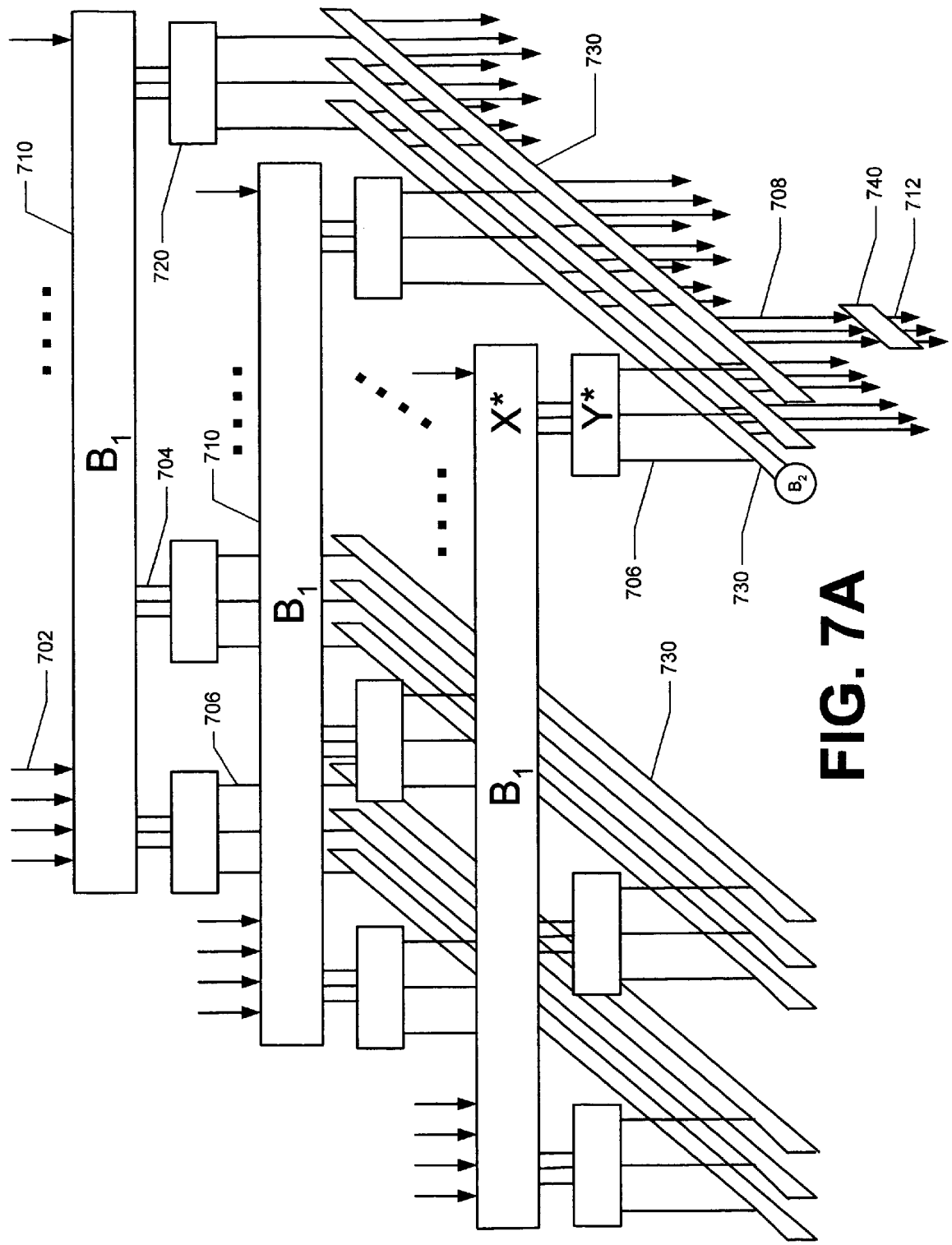
FIG. 7A is an overview of a two hop system.

The networks of the present section are built with building blocks with each block comprising one or more Data Vortex switches. The Data Vortex™ is itself a multi-hop system on a chip. In this section, data hops through two Data Vortex™ chips. Such a multi-hop system is illustrated in FIG. 7A. The system comprises two stages. A first stage contains M* building blocks $BU_1$ 710 for carrying shorter uncontrolled messages with each building block having N inputs and K·N outputs (in the specific example illustrated in FIG. 7A, K=3 so that the switch has N inputs and 3·N outputs). A second stage contains K·M* building blocks of uncontrolled data switches $BU_2$ 730 with each building block having M inputs and L·M lines to each output target (in the example, L=3 so that the switch has M inputs and 3·M outputs).

Figure 7B:
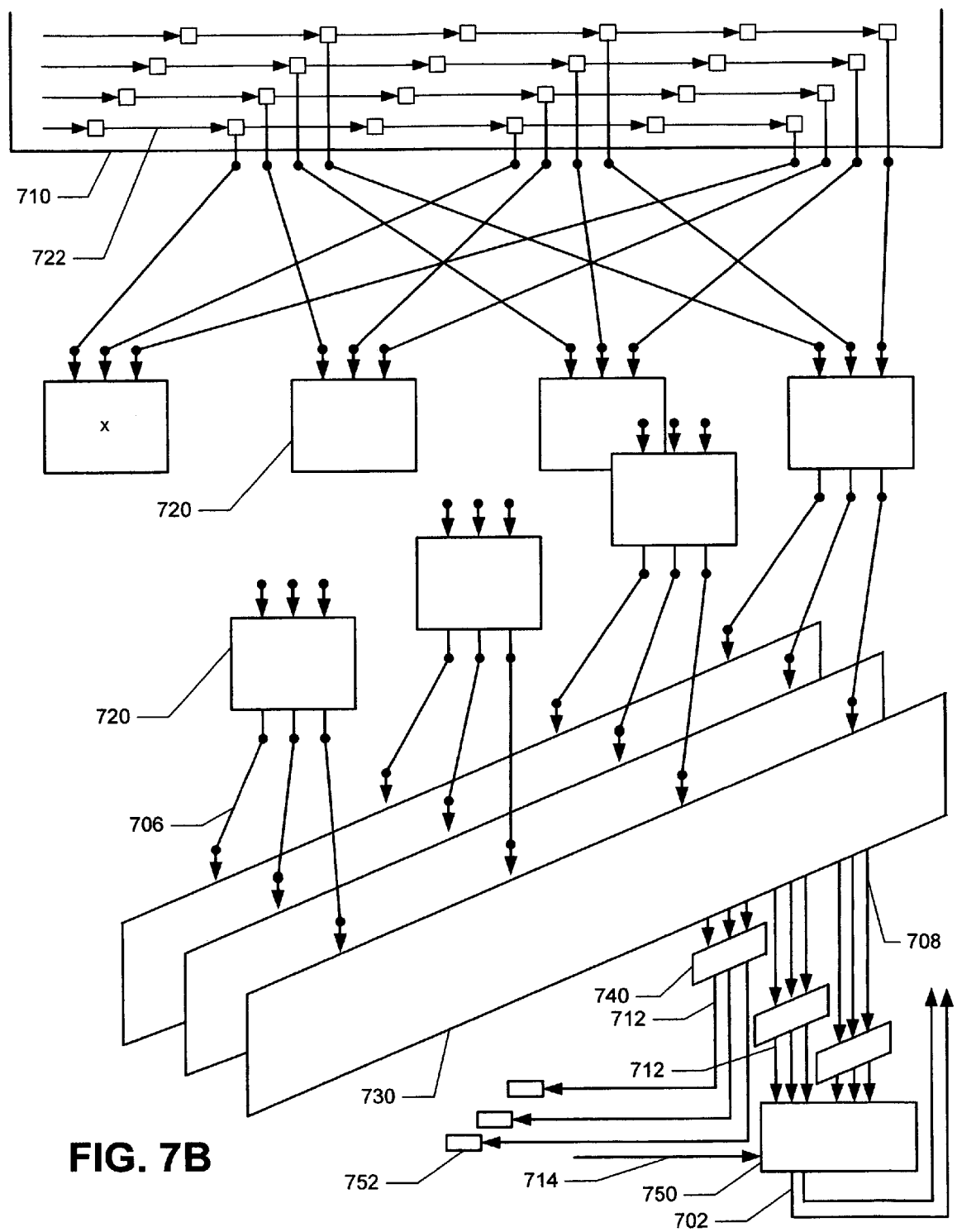
FIG. 7B illustrates an embodiment of a portion of a two hop system utilizing timing alignment and switching devices.
Figure 7C:
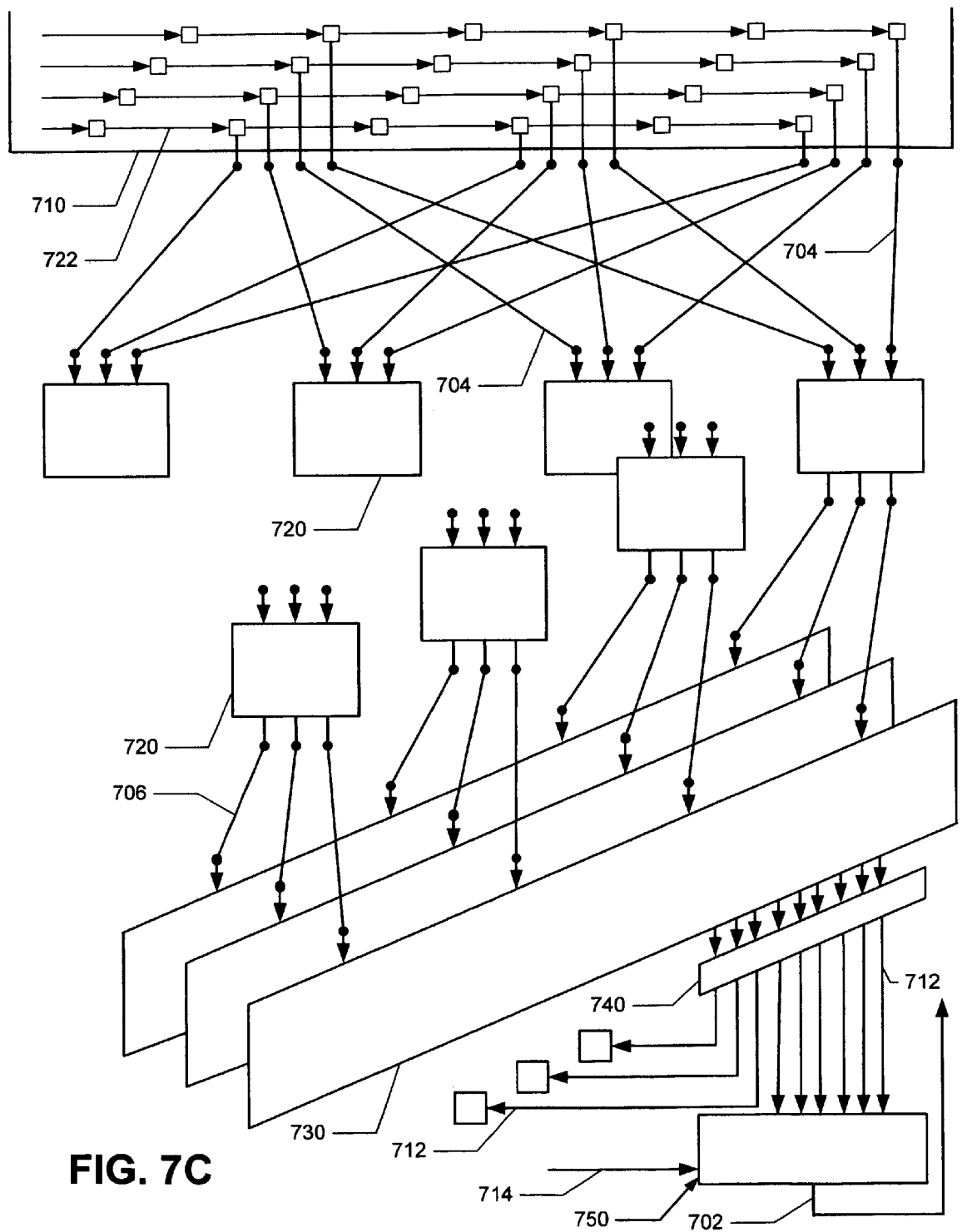
FIG. 7C illustrates an embodiment of a portion of a two hop system utilizing timing alignment devices with no active switching components.
Figure 7D:
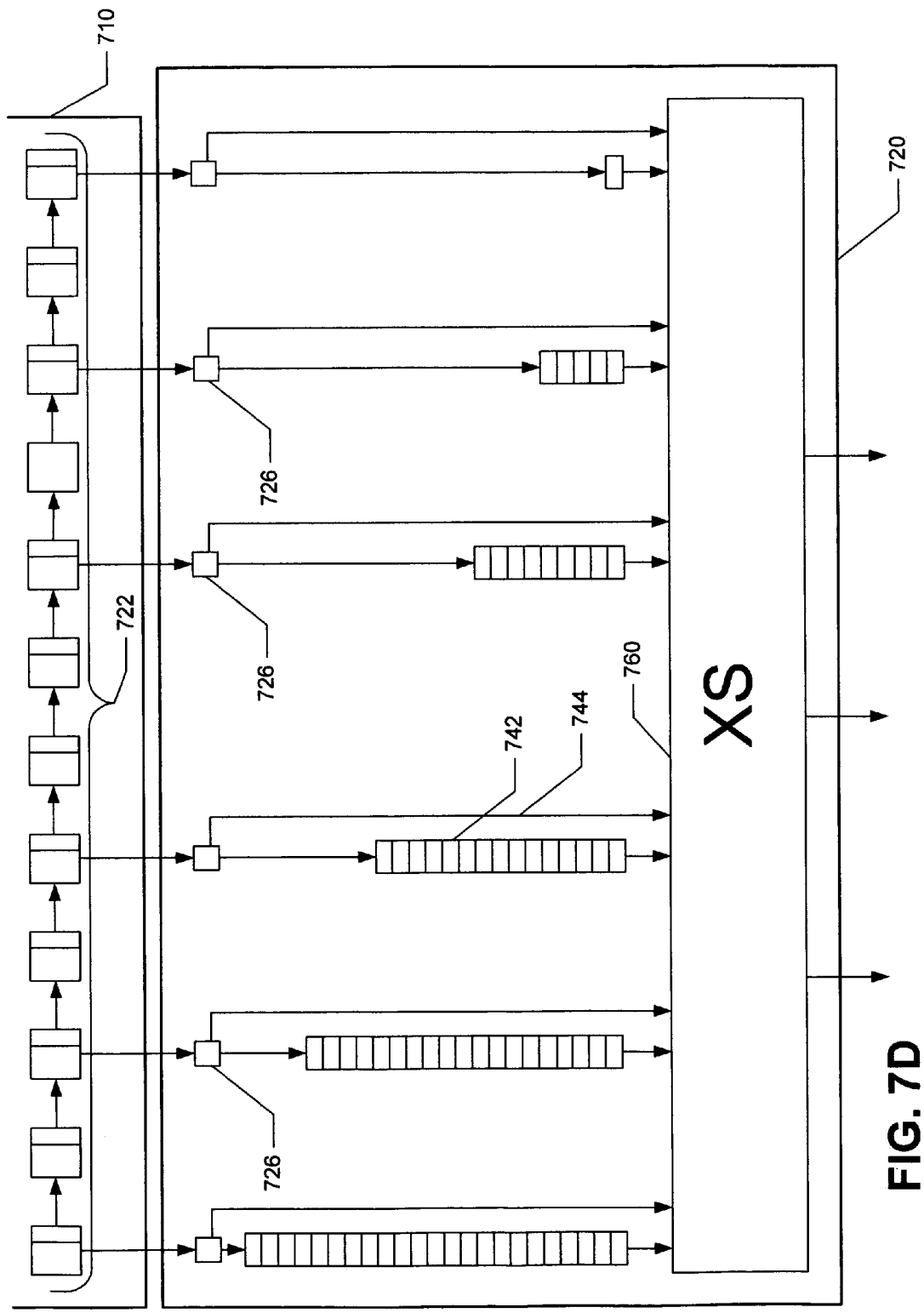
FIG. 7D is an illustration of a timing alignment and switching device.
Figure 7E:
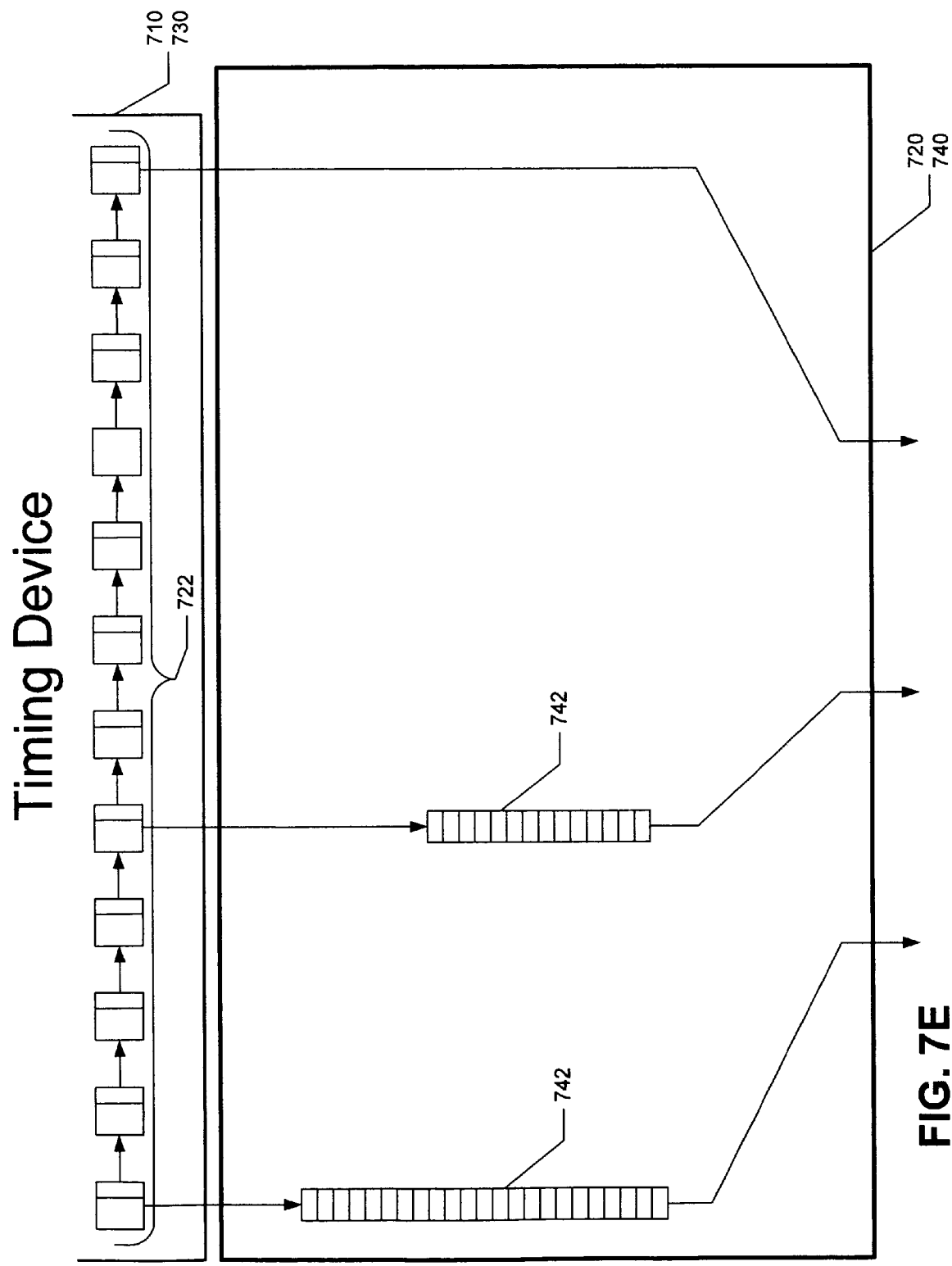
FIG. 7E is an illustration of a timing alignment device with no active switching element.

FIG. 7E illustrates the interconnection lines from the bottom row of one of the switches in the top block of switches. In order to have approximately the same amount of data in each of the three second-hop networks 730, one third of the inputs into the networks are from the first output of a bottom ring, one third of the inputs are from the second output of the bottom ring and the final third of the inputs are from the third input of the bottom ring. The timing devices 720 and 740, illustrated in FIG. 7E contain FIFOs of various lengths and are used to align packets so that all packets enter the second stage of the network at the same time. The time alignment is appropriate if the packets are sent in an electronic bus or if the packets are multiplexed into an optical fiber. In case a message remains on the top level of a second stage switch 730, a blocking signal is sent from the second stage switch to the first stage switch to enforce priority of the second stage switch, packets over packets in the first stage. This blocking signal travels in a control line (not illustrated). The blocking signal eliminates the possibility of a collision of packets entering a second stage switch with packets already in that switch. It is useful to have buffers at each input port of $BU_1$ and $BU_2$ able to hold one or more short packets. At packet entry time, messages can be fed from these buffers into the input ports of the Data Vortex™.

In a system with K output lines per output ring in the first stage switch and L lines per output ring in the second stage switch, a total of K·L output lines extend from the switch to the host. Moreover when the switch building blocks contain more than one switch, each of the output lines may include a parallel data carrying bus.

The Data Path from the Hosts to the $B_1$ Switching Blocks in an Uncontrolled Network The N·M hosts connected by the multi-hop systems illustrated in FIG. 7A naturally fall into N groups with M hosts in each of the N groups. In a physical configuration, the M hosts connected to a given set of uncontrolled building blocks $BU_2$ switch are located near to one another perhaps in a cabinet or group of cabinets. Therefore, the system of hosts and interconnect illustrated in FIG. 7A can be viewed as a cluster of N multi-processor computational units with each computational unit containing M processors. In the simplest embodiment, all of the processors in a given multi-processor computational unit are connected by an uncontrolled network and controlled network as illustrated in FIG. 1B. This connection between the hosts in a given multi-processor unit is in addition to the interconnection provided by the network of FIG. 7A.

The simplest method of connecting the N·M hosts to the blocks of $BU_1$ is to connect a given host to a single block of $BU_1$ by a single link. A desirable configuration is for the M hosts in a multi-processor system to be connected to M blocks in $BU_1$ with no two processors connected to the same block. This configuration enables one-to-one connections between the processors in a first multi-processor unit to the processors in a second computation group. The configuration also enables the packets of a message to be kept in order if the technology taught in incorporated reference No. 13 is employed. Nevertheless, this configuration has the following limitation. Refer to FIG. 7A with switch block X* 710 and alignment and switching element Y* 720. In the illustrative example three lines extend from X* to Y*. Suppose that, for an extended period of time, more than three hosts attempt to send messages from X* to Y*. Then messages will begin to back up in X*. The problem does not exist in the alternate embodiment in which hosts inject into different blocks 710 at different times. In one form of this embodiment, a host H* is connected to a given block $BH_0$ at time 0, at time 1. H* is connected to a block $BH_1$ at time 1. H* is connected to block $BH_2$ at time 2. Continuing in this fashion, at time M−1, H* is connected to block $BH_{M-1}$. At time M, H* is connected to block $BH_0$ and so forth. And moreover, if u≠v, then $BH_U \neq BH_V$. This is accomplished by a technique described in incorporated reference No. 9 entitled "A Controlled Shared Memory Smart Switch System" wherein data packets travel from the host to the network through a tree wherein the terminal nodes switch at each packet insertion time, the nodes one away from the terminal node switch every other packet insertion time, the nodes 2 away from the terminal node switch ever fourth packet insertion time. By this technique an imbalanced load causing a hotspot cannot occur. Other techniques for elimination of hotspots are discussed in the following sections.

A Multi-Hop, Controlled Stair-step MLML Network

The controlled network is also connected by a two tier structure as illustrated in FIG. 7A. The first stage contains M* building blocks $BC_1$ 710 for carrying longer controlled messages with each building block having N inputs and K·L outputs (in the specific example, K=3 so that the switch has N inputs and 3·N outputs. A second stage contains K·M* controlled building blocks $BC_2$ 730 with each building having M inputs and L·M* outputs (in the example presented in FIG. 7A, L=3 so that the switch has M inputs and 3·M outputs). In the present reference, there are instances when the symbol $B_1$ is used to designate either $BC_1$ or $BU_1$.

The building blocks in the uncontrolled multi-hop networks disclosed in the previous sections, may contain a single Data Vortex switch chip or it may contain multiple Data Vortex switches. In many systems, the packets carried by the controlled network are much longer than the packets carried by the uncontrolled network. Moreover, the packets carried by the controlled network are roughly equal in number to the packets carried by the uncontrolled network. In the applications, the controlled network may be designed to carry a heavier data load than the uncontrolled network and therefore, the building blocks in the controlled networks can achieve a higher degree of parallelism by containing more switches than the blocks in the uncontrolled network. In one embodiment, the switch chips in the controlled network are stacked in such a way that a given packet simultaneously passes through multiple stair-step switches in parallel.

In the multi-hop network comprising two levels of uncontrolled Data Vortex networks described in the previous section, hosts insert data into a first switch and receive data from a second switch. The same two tier structure is employed in the controlled network. The hosts (not illustrated) send data through lines 702 to the first set of switch blocks $BC_1$ 710. The switches in a BC, block are MLML stair-step switches. Data exits the blocks $BC_1$ and passes through lines 704 to timing and switching devices 720. In the uncontrolled system, devices 720 illustrated in FIG. 7E do not contain active switches. In a first embodiment of a controlled switching system, devices 720 contain crossbar switches as illustrated in FIG. 7D. The devices 720 receive sub-segments from the bottom level of an MLML switch and align the sub-segments using the FIFOs 742 of various lengths. The aligned sub-segments are switched by the crossbar switch SX 760 and sent to the second level block 730. The sub-segment header contains the crossbar target output port address. Since no two of the address are the same, the crossbar setting is local without global flow control. The data then passes from the align-and-switch devices 720 through lines 706 into switch blocks $BC_2$ 730. The switches 730 are also of the MLML stair-step design. In FIG. 7A, the network has three times as many switch blocks $BC_2$ as switch blocks $BC_1$. In other examples, fewer than three switch blocks $BC_2$ are included per switch block $BC_1$. In still other examples more than three switch blocks $BC_2$ are included per block $BC_1$. Data passes from the blocks $BC_2$ through lines 708 to align-and-switch devices 740. The devices 740 are of the same type, but not necessarily of the same size, as the devices 720. Only one of the align-and-switch devices 740 is illustrated in FIG. 7A. Finally, data passes from align-and-switch devices 740 through lines 712 to the hosts 750.

FIG. 7B illustrates an embodiment of a more detailed drawing of a portion of a small example of a controlled system illustrated in FIG. 7A. Systems of this type can be built in various sizes. FIG. 7B illustrates an embodiment of a system that supports 16 hosts. The top blocks $B_1$ 710 receive data from four hosts. In this very small illustrative example, the MLML switches in the block contain only four lines of nodes 722 on the bottom level as illustrated in FIG. 7B. All of the lines 704 connected to a given device 720 receive their data from the same bottom row 722 of the MLML stair-step switch 710. Packets entering the system illustrated in FIG. 7B each contain the address of its target output line 712 in their headers. Packets entering the MLML star-step switch 710 wormhole their way to a bottom row 722 of that switch. The packets always drop from the MLML switch to the align-and-switch device 720. The controlled nature of the system (described in detail in the next section) eliminates the need for contention resolution at this level. When packets enter the align-and-switch devices 720, the logic unit 726 of FIG. 7D sends the proper switching to its column in the crossbar switch. Since global control does not allow multiple messages entering the timing and switch to be targeted for the same crossbar output port, global control is omitted. The crossbar switch sends the packet (or packet segment or packet sub-segment) to the second tier switching block that is connected to the system target output. Packets exiting the align-and-switch device 720 travel through lines 706 and enter a second level MLML stair-step switch block $B_2$ 730. The packets exit the bottom level of the block $BC_2$ switches, travel through lines 708 and enter the second level alignment and switching devices 740. Align and switch devices 740 send the packet via lines 712 to a host 750 and other devices 752. In various embodiments, devices include other hosts, memory units a multicast switch, MLML switches and other devices 752. Also illustrated is a line 714 to the host 750 from a device 752. Line 702 is an output line from the host to the network. FIG. 7C is an illustration of a system that is similar to the system illustrated in FIG. 7B. In the system illustrated in FIG. 7C, a given switch device 740 is able to send a packet via lines 712 to a host 750 and also other devices 752. In FIG. 7C, the number of lines into device 740 is equal to the number of lines out of device 740. In other embodiments, the number of lines exiting device 740 is not equal to the number of lines entering device 740.

Flow Control in a Multi-Hop, Controlled Stair-step MLML Network

The latency through the uncontrolled system is not constant because messages may be forced to travel all the way around a stage Data Vortex one or more times because they are deflected by control signals from the second stage as a result of packets in the second stage. Messages on the bottom stage may also travel around the network one or more times because the lines exiting the network are overloaded or because insufficient exists in the buffer that receives data from the network.

Another aspect of the disclosed configurations is that control lines are used between levels of the uncontrolled network, but are not required between the levels of the controlled network. Furthermore, a predetermined constant latency exists through the controlled network. This aspect is enabled by a data flow procedure.

Figure 8A:
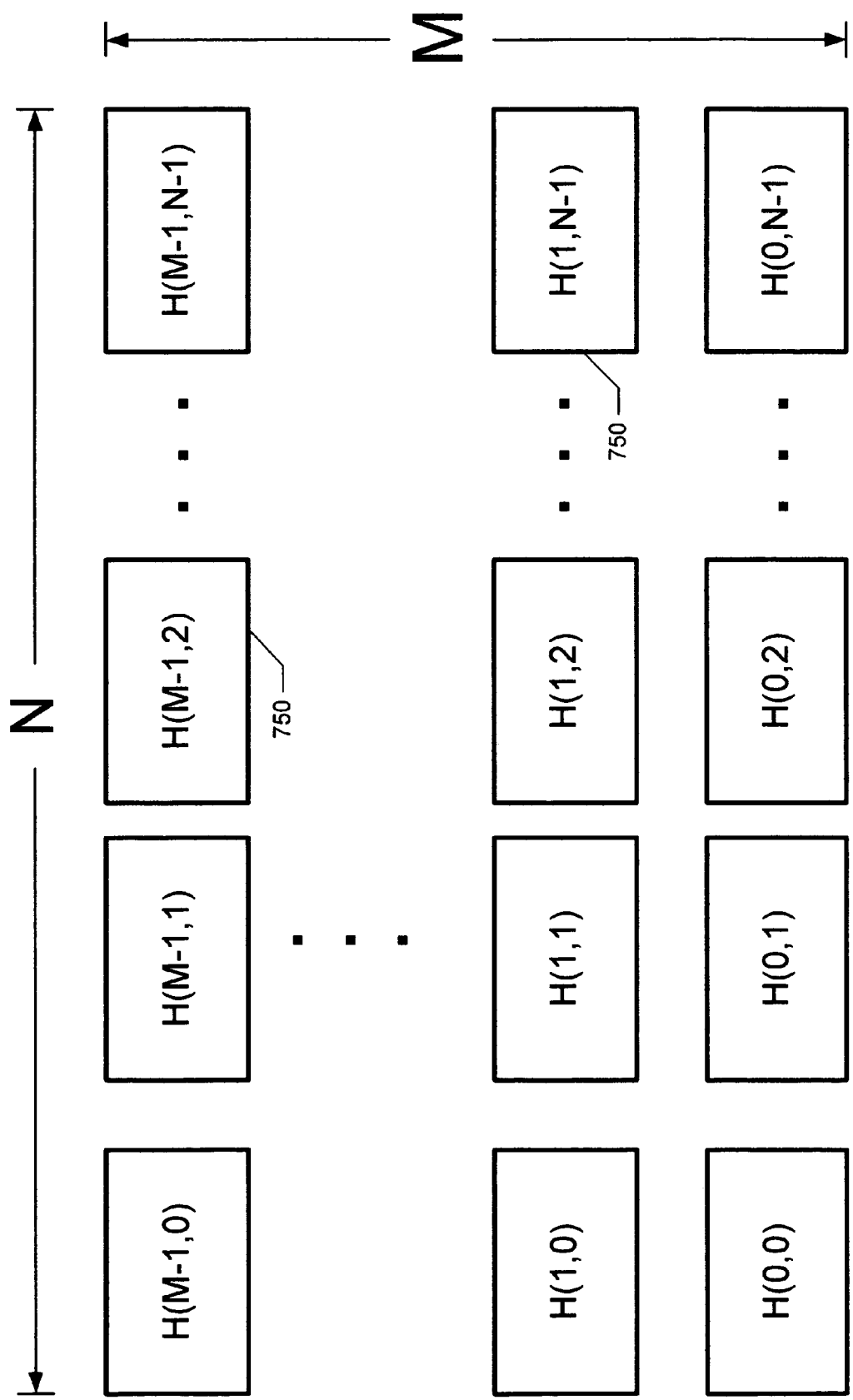
FIG. 8A is an illustration of the hosts arranged into a matrix having M rows with N hosts in each row.
Figure 9:
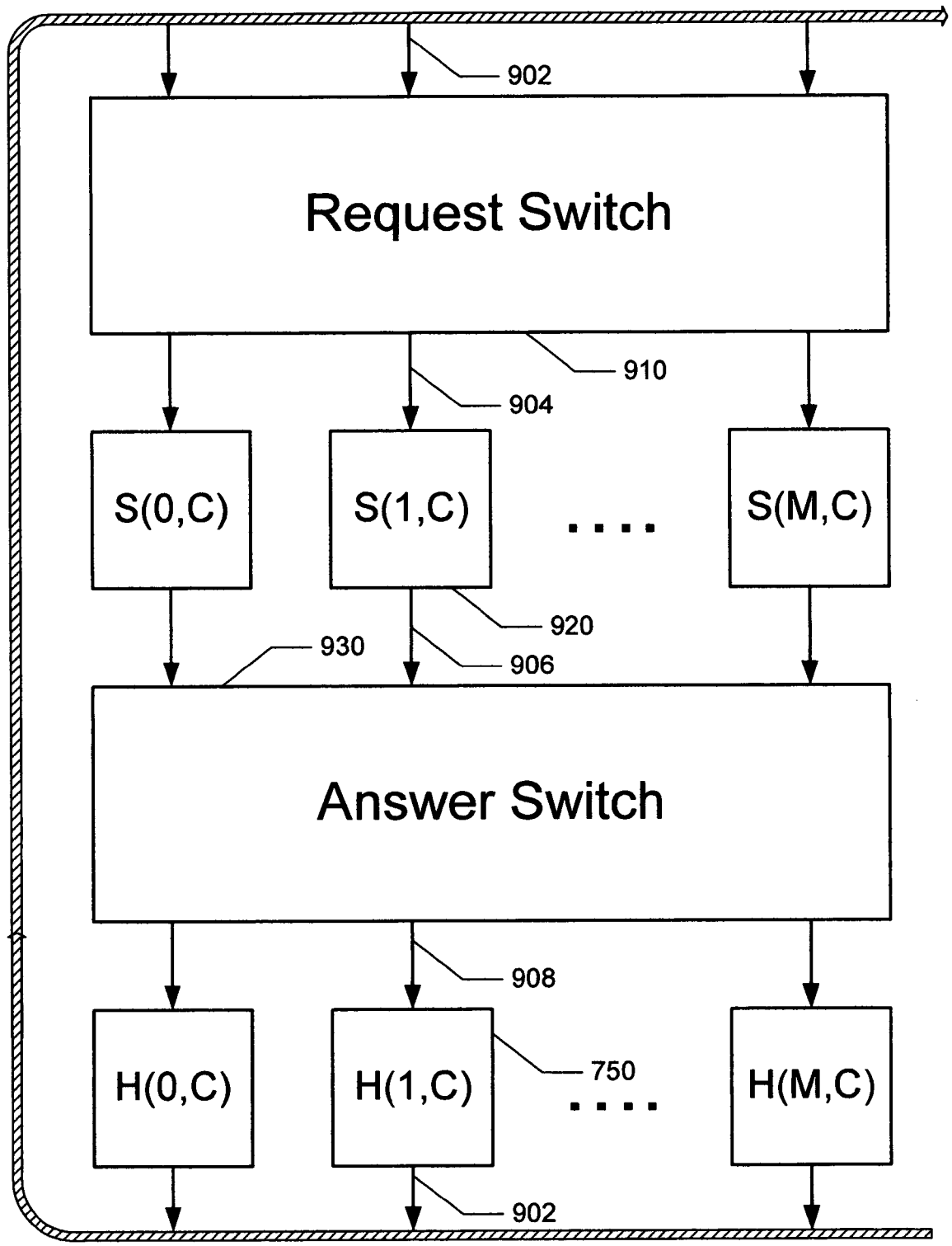
FIG. 9 is a schematic diagram of a parallel scheduling device employing a request switch, a plurality of scheduling units and an answer switch.

Refer to FIG. 8A illustrating N·M hosts that receive data from and send data to the interconnect structure illustrated in FIG. 1A. The hosts on a given column in FIG. 8A are all configured to receive data from a common set of switch blocks. All of the processors in a column of FIG. 8A may be placed in a single cabinet or rack. To properly regulate the flow of data through the network, the M processors (hosts) in a rack (column of FIG. 8A) possess the information regarding which of the lines 706 from the alignment and switching elements 720 have been reserved for packets. Based on this information, a processor has the ability to reserve any unreserved line 706 and also has the ability to un-reserve lines. The reservation manager of the align-and-switching units of a cabinet is illustrated in FIG. 9.

In a simple embodiment, each host has a single line (or bus) capable of sending data to into the network of FIG. 7A. A simple data flow model through the multi-hop system is accomplished as follows. A receiving host $H_R$ initiates the procedure of receiving data from a sending host, $H_S$. Host $H_S$ has an output port connected to an input port of a switch block $BC_1(S)$. Host $H_R$ has an input port connected to the output ports a group of switch blocks $BC_2(R)$. The switch blocks $BC_2(R)$ are all contained in the rack that contains $H_R$. A unique align-and-switch unit $AS_{SR}$ is adapted to pass data from $BC_1(S)$ to $BC_2(R)$. Host $H_R$ sends a request-to-schedule packet to the request switch asking to reserve a line 706 from $AS_{SR}$ to $BC_2(R)$. The request-to-schedule packet travels through the request switch and then through line 904 to the scheduler unit $SU_{SR}$ 920 that handles the reservations for lines 706 from $AS_{SR}$. If such a line is available, $SU_{SR}$ reserves a line and sends a schedule-accepted message through line 906, answer switch 930 and finally through line 908 informing $H_R$ which line has been reserved. If no line is available $SU_{SR}$ sends a schedule-rejected packet to $H_R$. In one embodiment, $SU_{SR}$ holds the request until a line is available and then responds and then sends a schedule-accepted packet. In another embodiment the $SU_{SR}$ does not hold the request and the host $H_S$ may re-request at a later time. In any case, $H_R$ does not request a message from $H_S$ until the scheduling unit has assigned a line 706 for that transmission. $H_R$ also reserves a line 712 for the transmission. Notice that $H_R$ is the sole manager of lines 712. Upon receiving a scheduled-accepted packet, $H_R$ sends a request-to-send packet to $H_S$ indicating which line 706 of $AS_{SR}$ has been assigned by $SU_{SR}$ to the packet (or group of packets) and also which line 712 is reserved for the transmission. The request-to-send packet is sent through the uncontrolled system. A host $H_S$ wishing to send data through a controlled network to a host $H_R$ initiates the action by sending a packet asking $H_R$ to request the data from host $H_S$. $H_R$ requests the data and $H_R$ sends the data as described above.

A fixed time-latency $\Delta T$ exists for the data packet to pass through the two-tier controlled MLML stair-step system. The data requesting host $H_R$ requests to receive data through its data receiving line $L_R$ from the data sending host $H_S$. Receiving host $H_R$ holds receiving line $L_R$ open from time $T_1+\Delta T$ until the message packet arrives or until a predetermined maximum waiting time is reached. The host $H_S$ has a queue of packets waiting to be sent, when the sending of one or more packets is completed, the host can immediately begin sending another single packet or group of packets. When a transmission is sufficiently near completion, $H_R$ sends a message packet to $SU_{SR}$ requesting that the line 706 be un-reserved. $SU_{SR}$ indicates the completion of the task by sending an acknowledgement packet to HR.

A Local Network for a Rack or a Cabinet

In case a column comprising M processors of FIG. 9 is located in a cabinet or rack, a local interconnect between these processors is desirable. An ideal local interconnect is made with MLML networks is illustrated in FIG. 1B. The local interconnect may connect the processors in the rack to a variety of other devices including shared memory and mass storage devices. This local network can be used to coordinate the efforts of several hosts in transmission of a large block of data across the multi-hop network of FIG. 7.

A Multi-hop Switching System with Multiple Inputs from the Hosts

In a standard embodiment, each cabinet contains M hosts and N hosts send data to a single switch block $B_1$. In one embodiment, each switch block $B_1$ has N inputs with one input from each rack. Each block sends data to all of the cabinets. No switch block $B_2$ is capable of sending packets to two different racks but is able to send data to all of the hosts in a single rack. In this embodiment, the hosts in a given column are all in the same cabinet with the hosts $H(0,J)$, $H(1,J)$, $H(2,J)$, ... $H(M−1,J)$ are all in cabinet J. The hosts in a given row all input data into a given switch block $B_1$ with the hosts $H(J,0)$, $H(J,1)$, $H(J,2)$, ... $H(J,N−1)$ all input data into the switch block $B_1(J)$. The configuration enables hosts in a given cabinet to simultaneously transfer data to the hosts in another cabinet in any chosen permutation. A weakness of the configuration is that in order to move data from M hosts in a given row to M hosts in a given column, all data passes through a single align-and-switch element. Therefore, the given system is not efficient at making "corner turns". This problem is overcome by having a given host able to send data to two different blocks $B_1(J)$ and $B_1(K)$ but leaving all of the other connections as they were in the single host to $B_1$ configuration.

The first set of connections from the hosts to the $B_1$ switch blocks is made as follows. The output lines 702 from the hosts on the $J^{th}$ row are labeled from left to right by $O(J,0)$, $O(J,1)$, $O(J,2)$... $O(J,N-1)$. The input lines 702 to the $J^{th}$ switch block $B_1$ are labeled from left to right by $I(J,0)$, $I(J,1)$, $I(J,2)$, ... $I(J,N-1)$. And each output $O(J,K)$ sends data to $I(J,K)$.

Figure 8C:
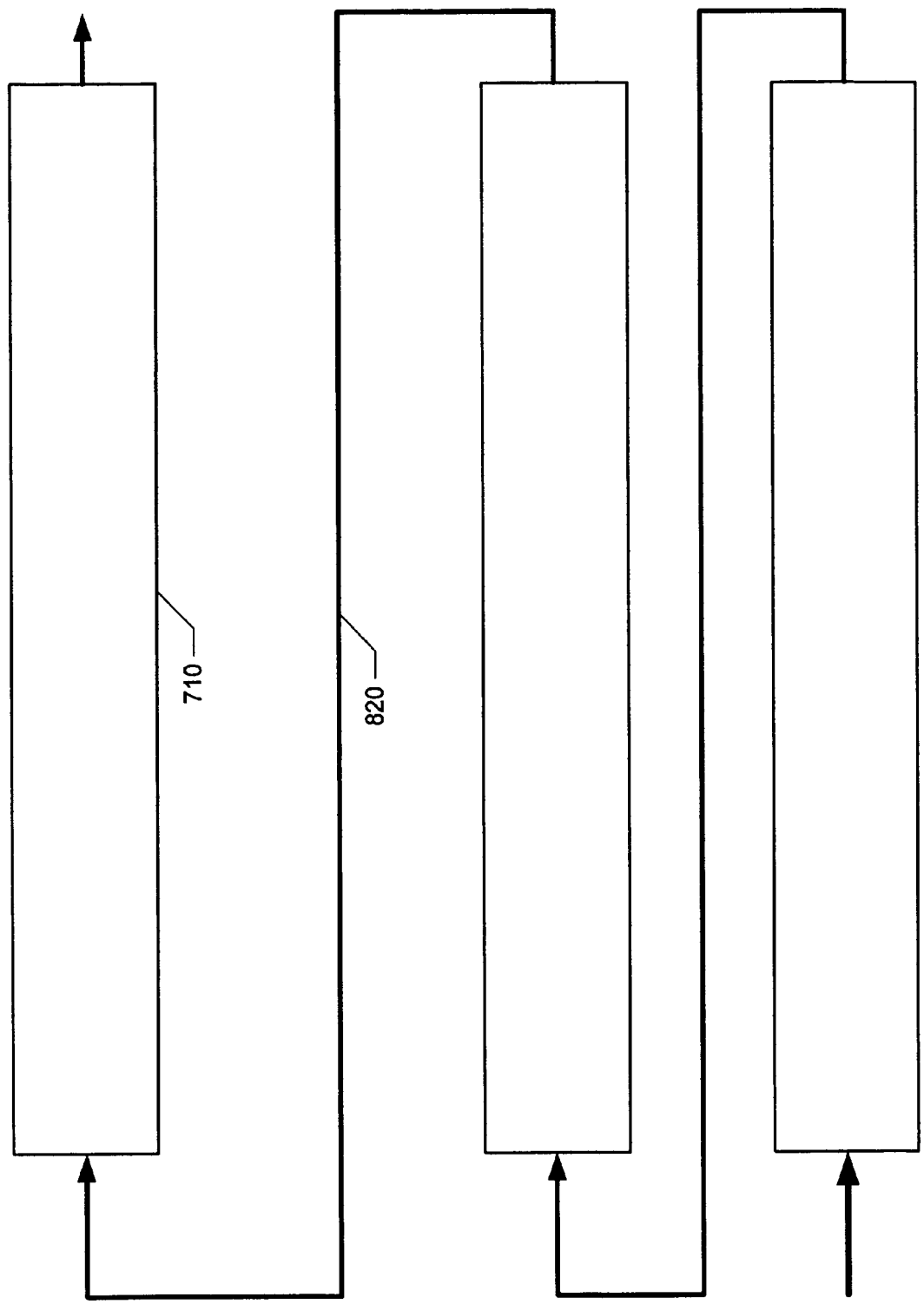
FIG. 8C illustrates an embodiment of a second pattern for connecting the output ports of the hosts to the input ports of the network.

The second set of connections from the hosts to the $B_1$ switch blocks is made as follows. Arrange the hosts into a sequence S where $S(0)=H(0,0)$, $S(1)=H(1,0)$, $S(2)=H(2,0)$, ..., $S(M-1)=H(M-1,0)$, $S(M)=H(0.1)$, $S(M+1)=H(1,1)$, ... $S(2M-1)=H(2M-1,1)$, $S(2M)=H(0,2)$ $S(MN-1)=H(M-1,N-1)$. This sequencing is illustrated in FIG. 8B where the sequencing traces along the sequencing path 810. The inputs to the switching blocks are arranged into the sequence T where $T(0)=I(0,0)$, $T(2)=I(0,1)$ ... $T(N-1)=I(0,N-1)$, $T(N)=I(1,N)$, $T(N+1)=I(1,0)$, ..., $T(NM-1)=I(N-1,M-1)$. This sequencing is illustrated in FIG. 8C where the sequencing traces along the sequencing path 820. Under this labeling convention, the host output port $S(N)$ is configured to send data on a line 702 to the switch block input port $T(N)$. In the present embodiment, there are two sets of connections from a host $H_S$ to the $B_1$ building blocks, in other embodiments, there may be more sets of such connections.

In case the hosts have more than one input into the network, the flow control protocols are slightly altered in a first flow control scheme. In a first flow control scheme, $H_R$ sends packets to two schedulers 920 asking for the number of free lines 706 from the corresponding align-and-switch units. Having obtained this information, $H_R$ reserves a line through the switch-and control unit with the larger number of free lines. In a second flow control scheme, $H_R$ makes a request to reserve a line through a single switch-and-control unit and makes a second request only in the case that the first request is denied. In a third flow control scheme, $H_R$ sends packets to two schedulers 920 asking to reserve lines 706 from the align and switch units as soon as one of the requests is granted to send through a given line L, $H_R$ sends a packet to the scheduler S that does not schedule line L with said packet requesting that lines governed by S be unreserved.

As before, the request to send data packet reserves a line from the host as well as lines 706 from the align-and-switch unit 720. A line 712 from align-and-switch unit 740 is also reserved.

In another embodiment which enables greater throughput, the hosts have multiple lines into switch blocks $B_1$, a structure enabled, for example, by doubling the number of such switch blocks and using multiple schemes to connect the hosts to the input ports of the $B_1$ switch blocks. In this configuration, a single host can simultaneously send data to multiple other hosts. A sending host also has the ability to simultaneously deliver data to multiple ports of the same receiving host. This configuration is described in the "Example System" section below.

Packaging the System

Switch blocks $B_1$ may be placed in a central location. It is most convenient to place all of the switch blocks $B_1$ in a central location. Switch blocks $B_2$ may conveniently be placed in the multiprocessor cabinets. The cables extend from the central location to the individual cabinets. Each host is configured the same way without regard to the number of cabinets connected to the central switch. Cables between the cabinets and the central switching system are also of the same construction regardless of the number of cabinets. The automatic repair function in the switches is handled in the same way in the central switch as in the cabinets. Another aspect of the disclosed embodiments is that the system is zero copy end to end.

Quality of Service Protocol

For Example, a system may include hosts with the ability to simultaneously inject packets into multiple $B_1$ building blocks. A host, $H_R$, adapted to receive a message comprising one or more long packets from a host $H_S$, is able to receive the message through 2·K different $B_2$ building blocks labeled $B_2(0)$, $B_2(1)$, ..., $B_2(K-1)$, $B_2(K)$, $B_2(K+1)$, ..., $B_2(2·K-1)$. K of these building blocks $B_2(0)$, $B_2(1)$, ..., $B_2(K-1)$, receive data from a $B_1$ building block, $B_1(1)$, that receives data from a host using a first host to $B_1$ connection scheme. The other K building blocks $B_2(K)$, $B_2(K+1)$, ..., $B_2(2·K-1)$, receive data from a $B_1$ building block, $B_1(2)$, that receives data from a host using a second host to $B_1$ connection scheme. Data exiting $B_1(1)$ travels through a timing-and-switching unit TS(1) while data exiting $B_1(2)$ travels through a timing-and-switching unit TS(2). The host $H_R$ sends a request to reserve a line through TS(1) or sends a request to reserve a line through TS(2). In one embodiment, the host decides whether to request a line through TS(1) or to request a line through TS(2) based on the number of free lines from $B_2(0)$ and $B_2(1)$ to $H_R$ compared to the number of free lines 712 from $B_2(2)$ and $B_2(3)$ to $H_R$. $H_R$ makes the request to reserve a line by sending a request packet to the scheduling unit illustrated in FIG. 9. The request to reserve a line to carry the packet or packets of a message M contains information concerning the urgency of the message M. This urgency can be based on multiple factors. If the logical unit 920 responsible for reserving the requested line or lines 706 has several outstanding requests to reserve lines for packets, the logical unit makes its decision which request to grant next based in part of the urgencies of the packets and also the amount of time that the requests have been outstanding. When the logical unit 920 grants the request to reserve a line for the message to $H_R$, $H_R$ sends a request to $H_S$ to send the packet. If $H_S$ has multiple outstanding requests to send messages, then $H_S$ decides which message to send next based in part on the urgency and also on the amount of time that $H_R$ has been waiting to receive the message.

An Example System

Figure 10A:
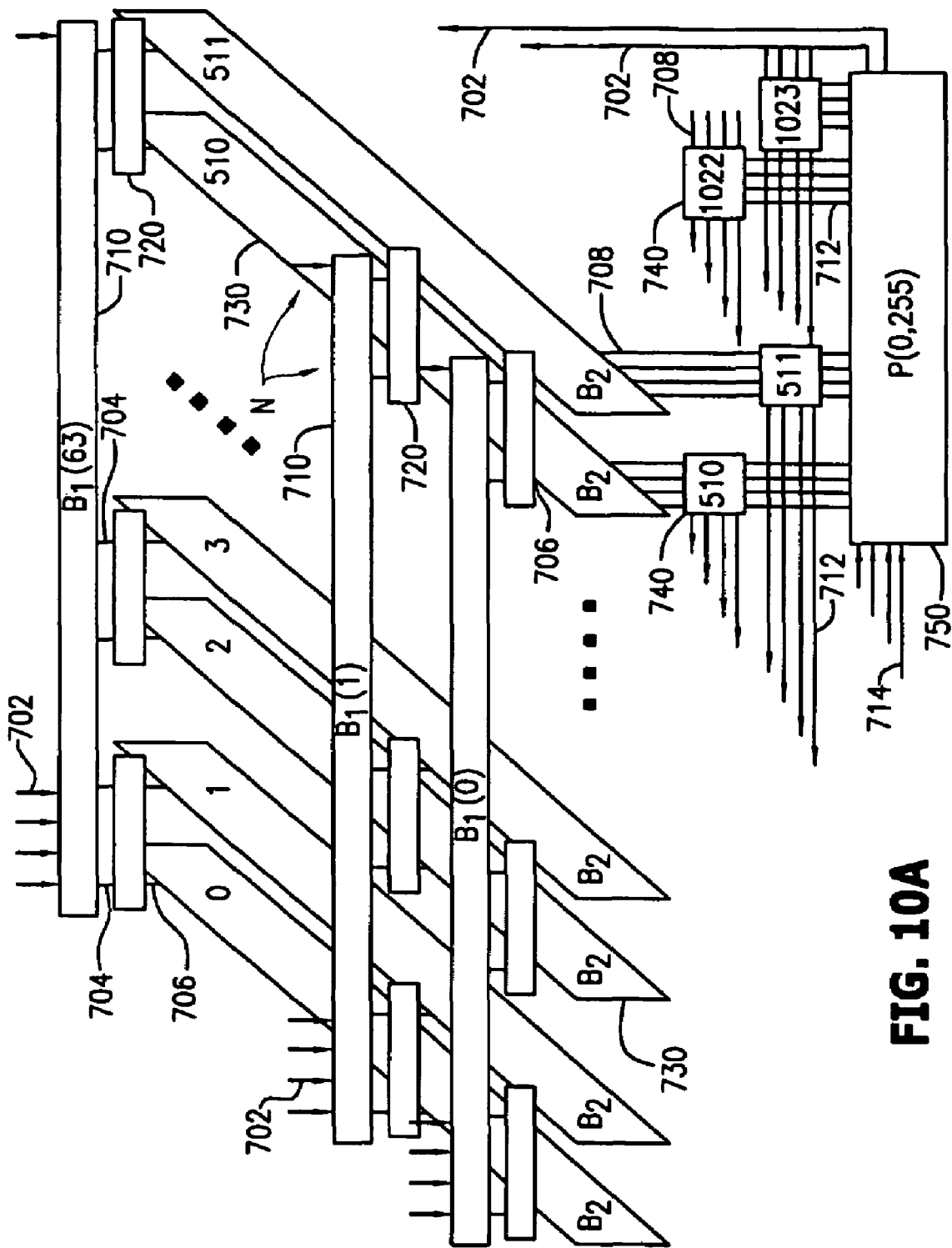
FIG. 10A shows a first half of an interconnect structure of an example system linking a plurality of multiprocessor computational units.
Figure 10B:
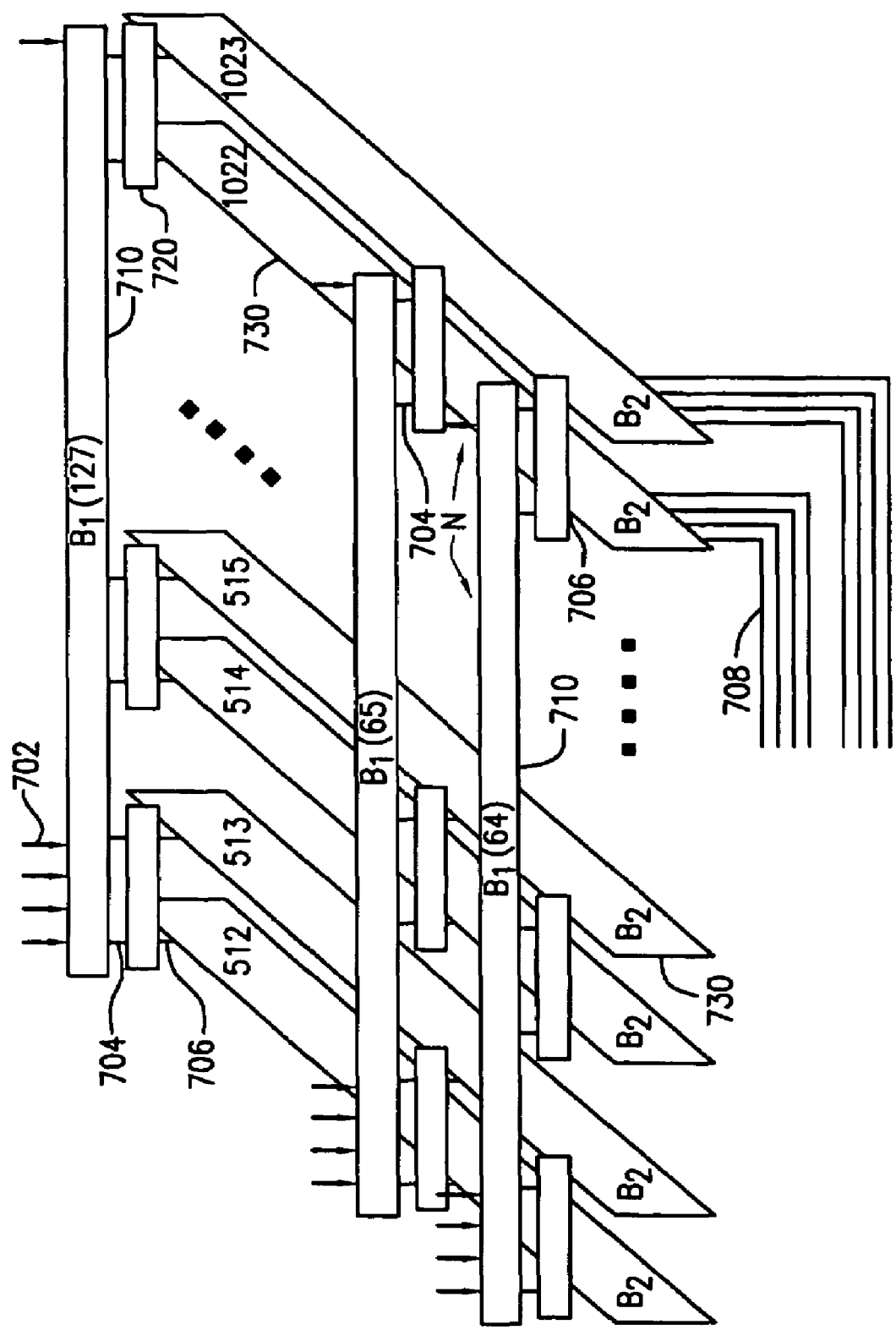
FIG. 10B shows a second half of an interconnect structure of an example system linking a plurality of multiprocessor computational units.
Figure 10C:
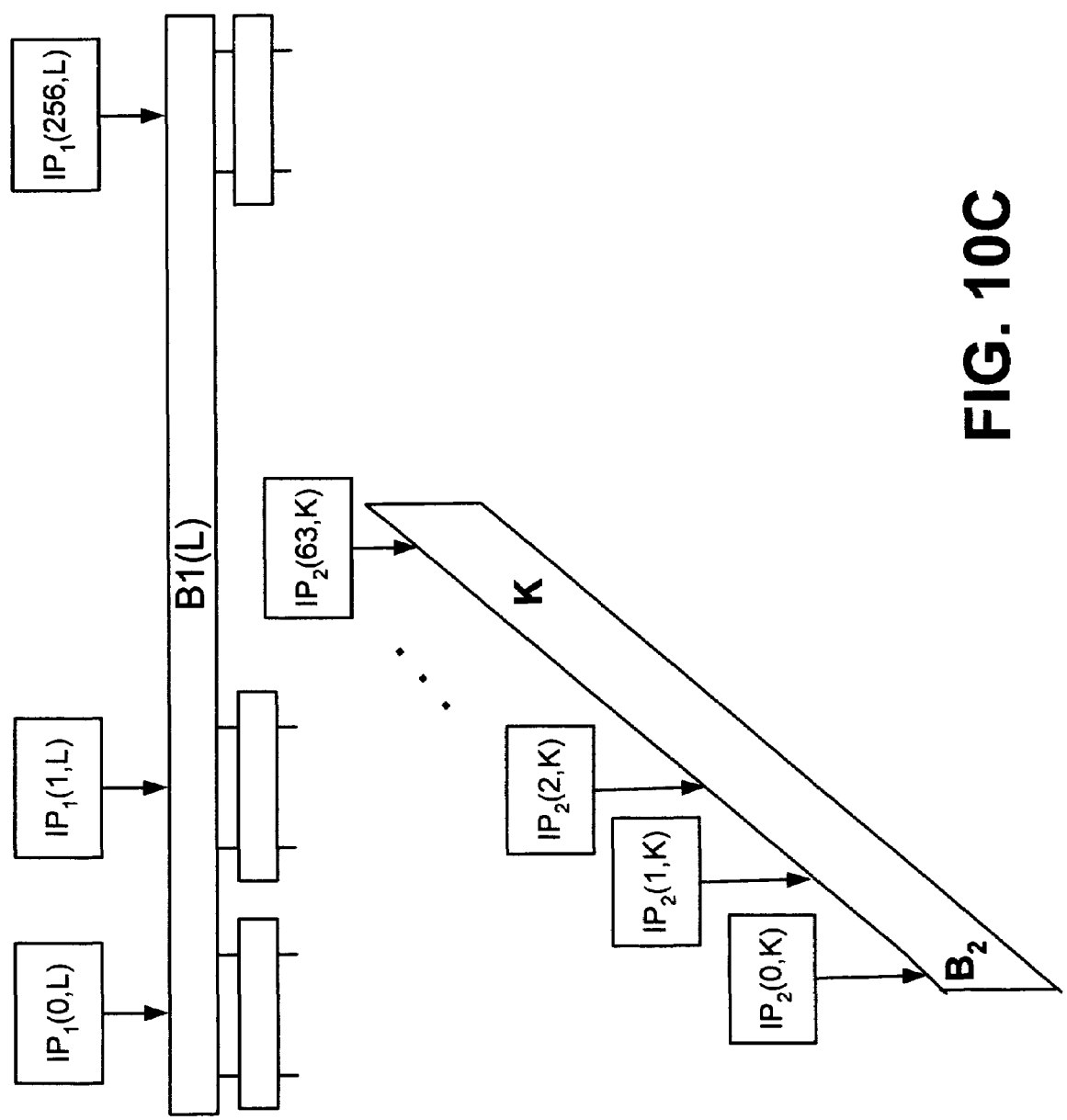
FIG. 10C illustrates the numbering scheme for a first stage switch block and the numbering scheme for a second stage switch block.

In an illustrative example illustrated in FIG. 10A, FIG. 10B, and FIG. 10C, N=256 multiprocessor computational units each containing M=64 processing elements are connected to form a supercomputing unit. A multiprocessor computational unit may comprise a parallel mainframe computer in a single cabinet, a plurality of blades, a rack of processors or some other configuration employing multiple processors. In the present disclosure, a multiprocessor computational unit may be simply a cabinet. The processing elements comprise: 1) a single processor; 2) a processor with associated memory; 3) a processor and memory system with the memory possibly of several types possibly including local cache, additional local memory, and memory that is shared with the other processing elements; 4) a system comprising a plurality of processors and associated memory where the system is on a single chip or on multiple chips; 5) a device that governs the flow of data into data storage devices possibly comprising random access memory, tape drives, disk drives, or some other data storage system or group of systems. The present disclosure may term a processing element simply as a processor.

The 256 multiprocessor computational units are labeled C(0), C(1), . . . , C(255). C(K) may be implemented as a parallel computer located in an individual cabinet. For the illustrative example of the present section, the switch blocks $B_2(2 \cdot K)$, $B_2(2 \cdot K+1)$, $B_2(512+2 \cdot K)$, $B_2(512+2 \cdot K+1)$ are also located in C(K). The switch blocks $B_2(2 \cdot K)$ and $B_2(2 \cdot K+1)$ are illustrated in FIG. 10A; the switch blocks $B_2(512+2 \cdot K)$ and $B_2(512+2 \cdot K+1)$ are illustrated in FIG. 10B. The block diagrams illustrated in FIG. 10A and FIG. 10B apply to both the uncontrolled networks and the controlled networks. For an integer K with $0 \leq K < 264$, the 64 processing elements contained in C(K) are labeled P(0,K), P(1,K), . . . P(63,K). The physical layout for the uncontrolled network and the controlled network are the same except that in the controlled network, a stack of chips replaces a single chip in the uncontrolled network. The number of switch chips in a controlled switching block may be different than the number of switch chips in an uncontrolled switching block. The number of switches in a block is a design parameter that is a function of the expected mix of short and long messages and the ratio of the lengths of short and long messages. A single message passes through multiple switches in a controlled switch block whereas in one embodiment, a single message passes through only one switch in an uncontrolled switch block. In one physical embodiment, the switch blocks $B_1$ (both the controlled and uncontrolled switch blocks) as well as the 720 units (align units or align and switch units) are all located in a central switch hub. The 256 multiprocessor computational units each have one bundle of input connections from the central switching core and one bundle of output connections to the central switching hub. Data is sent from the multiprocessor computational units to the stage one building blocks $B_1$ of the central switching hub. Many techniques may be used for connecting the processing elements to the $B_1$ blocks. One effective scheme is presented. In the present example, each processing element has two output ports connected to input ports of the first stage switch blocks $B_1$. A given processing element P(J,K), the $J^{th}$ processing element in cabinet C(K), is connected to an input in a first block $B_1(L)$ with $0 \leq L < 64$ using connection scheme one and to a second block $B_1(L)$ with $64 \leq L < 128$ using connection scheme two as described below. The numbering scheme for the inputs to the $B_1$ switch blocks progress from left to right and the input ports for $B_1(L)$ are labeled $IP_1(0,L)$, $IP_1(1,L)$, . . . $IP_1(255,L)$ as illustrated in FIG. 10C. The inputs to the $B_2$ switch blocks are arranged from bottom to top and for switch block $B_2(K)$ are labeled $IP_2(0,K)$, $IP_2(1,K)$, . . . , $IP_2(63,K)$ as illustrated in FIG. 10C.

In scheme one, each of the processors sends data to switch blocks $B_1(J)$ where $0 \leq J < 64$ illustrated in FIG. 10A. In scheme one, no two processing elements in the same cabinet K (the processors in column K) of FIG. 11 send data to the same $B_1$ switch block. Processing element P(J,K) sends data to data switch block $B_1(J)$ input port $IP_1(K,J)$ of data switch block $B_1(J)$.

In scheme two, each of the processing elements send data to switch blocks $B_1(J)$ where $64 \leq J < 128$ illustrated in FIG. 10B. In scheme two, all of the processing elements in the same cabinet K (the processors in column K) of FIG. 11 send data to the same $B_1$ switch block. Processors in computational units (cabinets) C(0), C(1), C(2), and C(3) send data to $B_1(64)$. Processors in C(4), C(5), C(6), and C(7) send data to $B_1(65)$. In general, for the nonnegative integer R<64, processors in C(4·R), C(4·R+1), C(4·R+2), C(4·R+3) send data to $B_1(64+R)$. Processors in C(4·R) deliver their data to the leftmost input ports of $B_1(64+R)$ by P(T,4·R) sending data to IP(T,R). Processors in C(4·R+1) send data to the next 64 input ports of $B_1(64+R)$ by P(T,4R+1) sending data to IP(T+64,R). Similarly, P(T,4·R+2) sends to IP(T+128,R) and P(T,4·R+3) sends data to IP(T+192,R). The uncontrolled network and the controlled network have the same connection patterns to and from the switch blocks $B_1$ and $B_2$. The notation and numbering scheme for the uncontrolled network is identical to the notation and numbering scheme for the controlled network.

The uncontrolled switches may be of the simple Data Vortex design or they may be of the design in incorporated reference No. 13 entitled "Means and Apparatus for a Self-Regulating Interconnect Structure". The uncontrolled network carries "short packets" in contrast to the controlled network that carries "long packets". A bound SMAX is imposed on the number of short packets that can be used to send a message through the unscheduled network. In one embodiment, SMAX=1. If a message is too long to fit in SMAX small packets, then the said message is sent through scheduled switch blocks. Several illustrative cases using the controlled and uncontrolled networks follow:

In a first example, processor $P_S$ desires to send a short message (comprising no more than SMAX short packets) to a processor $P_R$ with the processor $P_R$ in a different cabinet than $P_S$. $P_S$ sends the packets to the uncontrolled network hub containing the uncontrolled $B_1$ blocks. A short packet passes through a single switch in an uncontrolled $B_1$ block residing in the central switching hub and is switched to an uncontrolled $B_2$ block in the cabinet containing $P_R$. The packet passes through a single switch in the $B_2$ block and is delivered to the processor through a line that is reserved for unscheduled packets. In case of a single 1 in a special one bit location in the packet header, the align and switch device 730 sends the packet to a location separate from the processor; in case of a 0 in the same special header location, device 730 sends the packet to the processor. In FIG. 10A only one processor, P(0,255) is pictured. Packets are sent to P(0,255) by $B_2$ switch blocks 510, 511, 1022, and 1023. In systems that use acknowledgements, $P_R$ returns an acknowledgement of receipt through the unscheduled network.

In a second example, a processor $P_R$ requests data from a processor $P_S$ with $P_R$ and $P_S$ in separate multiprocessor computational units and the requested data is capable of being sent in a single short packet or in no more than SMAX packets. In this second example, the uncontrolled network handles both the request packet and the packet or packets of requested data from $P_S$ to $P_R$ using actions described in the first example. In an alternate embodiment, there is one network for carrying request packets and another network for carrying short packets that are not request packets. There may be additional networks for carrying various types of short messages such as acknowledgement packets and non-acknowledgement packets.

In a third example, a processor $P_R$ requests data from a processor $P_S$ with $P_R$ and $P_S$ in separate cabinets and with the requested data unable to be placed in SMAX or fewer short packets. For a specific case of the third example $P_R$=P(15, 28) requests 5 long data packets from $P_S$=P(31, 78). In data injection scheme one, P(31,78) inserts data into $B_1(31)$ at IP(78,31). In data injection scheme two, P(31,78) sends data to IP(31+128, 64+19). This is because P(31,78)=P(31, 4·19+2) which sends data to IP(31+128,64+19)=IP(159, 83). Therefore, P(31,78) sends data to $B_1(31)$ and $B_1(83)$. $B_1(31)$ has two data paths into C(28) and $B_1(83)$ has two data paths into C(28). As soon as one of the lines $L_1$ 706 is open, and also there is an open line $L_2$ 708 connecting $P_R$ and the $B_2$ switch with an input port that receives data from $L_1$, then processor $P_R$ reserves $L_1$ and $L_2$ for the data packets from processor $P_S$. A request to send data packet is then sent from $P_R$ to $P_S$. $P_R$ is able to ascertain the status of the lines into C(15); reserve these lines; and un-reserve these lines by utilizing the hardware depicted in FIG. 11. As soon as $P_S$ has an output line free to send data through $L_1$, the 5 long packets are sent sequentially through the $B_1$ block capable of sending data to $L_1$. Each of the packets is sent in parallel through $B_1$ and $B_2$ switch blocks. The header of each of the segments of the packets contains the target output of the $B_1$ switch block, $L_1$, the target output of the $L_2$. Notice that the five packets arrive in order and, as soon as the first bit of the first packet arrives, the time the last bit of the last packet will arrive is known. Therefore, processor $P_R$ is able in advance to know at what time to request that the lines $L_1$ and $L_2$ be unreserved. Details of the operation of the controlled networks are handled in the next section.

In a fourth example a processor $P_S$ needs to send a message M to a processor $P_R$ with $P_R$ and $P_S$ in separate cabinets and the message M is to long to be send in SMAX short packets. Then the processor $P_S$ sends a short packet through an uncontrolled network switch in a $B_1$ switch block in the central switching hub and then through an alignment element 720 and then through a switch in a switch block $B_2$ with $B_2$ in the same cabinet as $P_R$. In response to this short packet, $P_R$ carries out the steps in the third example to request M from $P_S$ and then receive the message from $P_S$.

Details of Operation of the Controlled Networks

Figure 11:
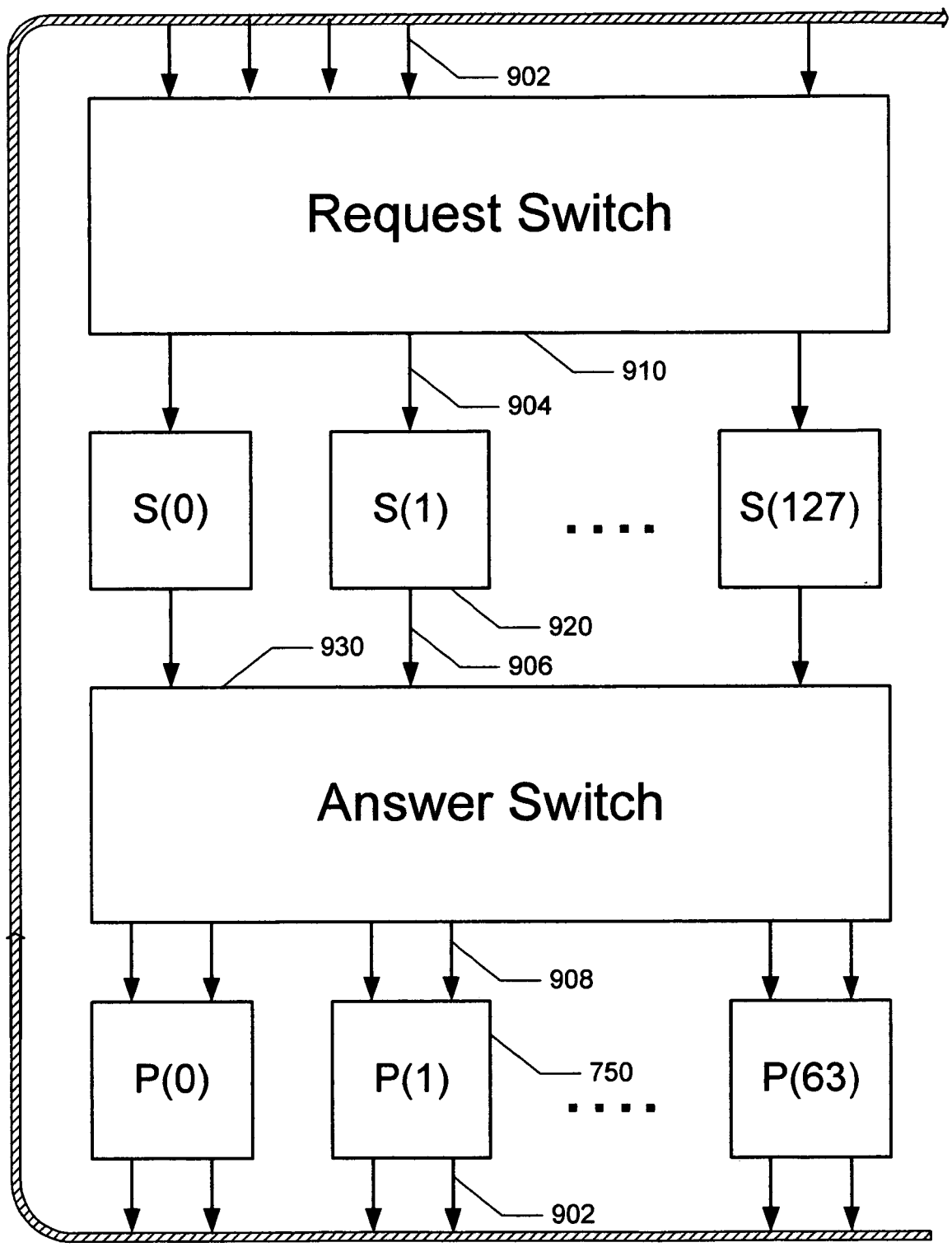
FIG. 11 illustrates an embodiment of a schematic diagram for a parallel scheduling device for an example system linking a plurality of multiprocessor computational units.

Refer to FIG. 10A, FIG. 10B and FIG. 11. A processor can simultaneously receive packets from multiple processors. In fact, a processor can receive two streams of data from the same processor. In the example of this section, the process of receiving a single data stream from a sending processor is disclosed. As in example three of the previous section, the processor $P_R$=P(15, 28) requests five long data packets from the processor $P_S$=P(31,78). $P_R$ ascertains that $P_S$ can send messages through $B_1$(31) by a first scheme and through input port $B_1$(64+19) because 19 is the integral part of 78/4. Therefore, any packet from $P_S$ to $P_R$ either passes through $B_1$(31) or through $B_1$(83). One align-and-switch element ASE(31,28) switches data from $B_1$(31) to the cabinet 28 switch blocks $B_2$(56) and $B_2$(57). Another align-and-switch element ASE(83,28) switches data to from $B_1$(83) to the cabinet 28 switch blocks $B_2$(512+56)=$B_2$(568) and $B_2$(512+57)=$B_2$(569). Packets sent from $P_S$ to $P_R$ travel from the central switching hub align-and-and switch elements 720 to the $B_2$ switch blocks in cabinet 28 via the four lines $L_A$, $L_B$, $L_C$ and $L_D$ as follows:

Line $L_A$ carries data from ASE(31,28) to $B_2$(56).
Line $L_B$ carries data from ASE(31,28) to $B_2$(57).
Line $L_C$ carries data from ASE(83,28) to $B_2$(568).
Line $L_D$ carries data from ASE(83,28) to $B_2$(569).

Refer to FIG. 11 illustrating the scheduler comprising 128 scheduling units 920, a request switch 910, an answer switch 950 and the 64 processors in cabinet 28. Each of the schedulers corresponds to an align-and-switch element that is capable of sending data to cabinet 28. In one simple embodiment, the scheduling units are capable of reserving lines and maintaining queues of requests waiting to use the lines. The functions are simple and use up a very small amount of silicon so that the entire FIG. 11 should fit on a single chip. In the example, $P_R$=P(15,28) has free input lines 708 positioned to receive output from one or both of the cabinet 28 switch blocks $B_2$(56) and $B_2$(57). In the example, suppose that $L_A$ is the only free line from $B_2$(56) to $P_R$. $P_R$ chooses a constant PMAX and requests (by means of a packet through the request switch to S(31) that S(31) reserve the line $L_A$ for 5 long packets provided that $L_A$ has not previously reserved that line for more than PMAX long packets. Three cases are presented.

In a first case, the line $L_A$ has not been previously reserved. S(31) reserves the line and notifies processor $P_R$ by means of a packet through the answer switch, that the line has been reserved. Processor $P_R$ then sends a request to $P_S$ though the uncontrolled switching system to send the five packets. As soon as $P_S$ has a free line output port to line 702 leading to $B_1$(31), the packets will be sent in order. When the first packet arrives at processor $P_R$, then processor $P_R$ is aware of the arrival time of the last packet and is able to inform S(31) that it may release the line $L_A$.

In a second case, the line is reserved but the queue of packets waiting to use the line is less than PMAX. In this case, S(31) immediately informs $P_R$ of that condition when the line becomes free, S(31) reserves the line and notifies $P_R$ of that condition. The process continues as in the first case.

In a third case, more than PMAX packets in the queue waiting to use line $L_A$ in which case, $P_R$ makes a request to send on another line and the process repeats as above.

In the above cases, $L_A$ was available but $L_B$ was not available. If both lines are available, then $P_R$ sends a request to S(31) indicating that both lines are free. In this case, S(31) chooses a line and so informs $P_R$.

If all of the lines $L_A$, $L_B$, $L_C$, $L_D$ are reserved for too long of a time, then $P_R$ has the option of requesting that the input controller of C(31) arrange for another processor $P_T$ to request the five packets and place them in shared memory in a location that is accessible to an align-and-switch device 740 that has outputs to $P_T$ and also has outputs to the memory location that the C(31) input controller has designated for the five packets. When $P_T$ requests the data from $P_S$, $P_T$ requests that a one be placed in the proper location in the header so that the align-and-switch device 740 is able to route the data to the proper memory location. The align and switch devices have four inputs and eight outputs so that incoming messages need three bits to set the output port for a given input port. The setting is local because there can be no two messages targeted for the same output.

In another embodiment, when a given processor output is overloaded because the memory that is under his control is in heavy demand, that memory can be copied into other spaces so that more than one processor can handle the request.

In another embodiment, the operating system of a given cabinet can arrange for a large number of processors to simultaneously send portions of a large block of data.

Hot Spots

In many supercomputer network designs data may move efficiently in certain patterns but the efficient movement of other patterns produces hot spots that cause increased latency. In the disclosed embodiments which use only the scheme one connection pattern and the switch blocks of FIG. 10A, the cabinets may be coupled in a high bandwidth low latency arbitrary interconnection. For the two cabinets A and B, and for the permutation π, it is possible that processor P(0,A) sends to processor P(π(0),B), processor P(1,A) sends to processor P(π(1),B), processor P(2,A) sends to processor P(π(2),B), . . . , processor P(63,A) sends to processor P(π(63),B). However, the simultaneous sending of data from processor P(0,0) to processor P(0,100), from processor P(0,1) to processor P(1,100), from processor P(0,2) to processor P(2,100) . . . and from processor P(0,63) to processor P(63,100) is not enabled. However, scheme two does enable such a simultaneous transmission. The combination of scheme one and scheme two alleviates the type of hot spots that can occur in two hop "twisted cube connections". Elimination of these types of hot spots reduces the problem of prearrangement and copying of data to perform certain data movements through the network.

Multiple Packets to a Single Processor

A key feature of the system is that multiple sources can simultaneously send data to a single given host. This desirable feature is a natural attribute of the Data Vortex. Moreover, if a processor reserves an input for a given packet, this reservation does not prohibit other packets from being delivered to the processor. In fact, the bandwidth into a single packet is eight times the bandwidth out of that processor. This eliminates the problem of blocking due to clogged output ports.

The Processors

In the illustrative disclosure, numerous lines extend from the $B_2$ switch block modules into the processors. A processing element capable of using the bandwidth of the present system is itself a system of the type illustrated in FIG. 1B. Such a system can fit on a chip or a group of tightly coupled chips. In this way the number of processors can be far greater than 256·64 as was the case in the example system and still have all of the cabinets connected with a one hop system. In case the number of sub-processors in a processor is large, bandwidths of the example system is not sufficient so that more chips may be added to the switch stack modules. Addition to the stack does not increase the complexity of the system.

SYSTEM ADVANTAGES

The switching hub of the present system has the advantage of behaving like a single hop network while internally, it is a multi-hop system. The hub is far superior to a crossbar with 256 inputs. It can deliver multiple streams of data to a given processor while keeping the packets in the stream in order. It can correct packet errors not only in the payload but in the header as well. The fan out property alleviates congestion at the receiving end as well as allowing multiple streams from various sources to simultaneously enter a processor. The in cabinet schedulers use Data Vortexes as part of a parallel processing engine to manage data flow.

In addition to offering outstanding performance, the systems taught in the present patent can be constructed economically. In an embodiment where communication within a cabinet is electrical and communication between cabinets is optical, data traveling between cabinets is sent optically from the processors to the central hub where it undergoes an optical to electrical conversion and then is sent from the central hub to the cabinets where it requires another optical to electronic conversion. Therefore the extremely high radix of the building blocks provides an economic solution as well as providing outstanding performance.

We claim:

1. An interconnection network N consisting a first stage network $N_1$ and a second stage network $N_2$ and a collection of devices D which are outside of the network so that a device x in D is capable of sending data to a device y in D with the data first being sent from x to $N_1$ and then from $N_1$ to $N_2$ and then from $N_2$ to y and;

the network $N_1$ having more outputs than inputs and moreover; outputs from the network $N_1$ being connected to inputs of the network $N_2$ and;

the network $N_2$ having more outputs than inputs and moreover; the number of inputs to a device w in D from $N_2$ exceeds the number of outputs from device w into $N_1$ and;

the device w with NP input ports simultaneously receives data from NP devices in D.

2. An interconnect structure in accordance with claim 1 wherein $N_1$ and $N_2$ are circular Data Vortex™ networks.

3. An interconnect structure in accordance with claim 1 wherein $N_1$ and $N_2$ are stair-step Data Vortex™ networks.

4. An interconnect structure in accordance with claim 1 wherein $N_1$ has M inputs and K·M outputs and;

$N_2$ has K·M inputs and K·L·M outputs and;

a device $H_R$ has K·L inputs from $N_2$ and;

for a given input port ip of $H_R$, A device $H_S$ is able to send a message packet mp through $N_1$ and $N_2$ so that the packet mp enters device $H_R$ through ip.

5. An interconnection network N consisting a first stage network $N_1$ and a second stage network $N_2$ and a collection of devices D which are outside of the network and;

a collection $C_1$ of switches with each switch in $C_1$ having multiple inputs from $N_1$ and multiple outputs to $N_2$;

a device x in D sending data to a device y in D with the data first being sent from x to $N_1$ and then from $N_1$ through a switch s in $C_1$ to $N_2$ and then from $N_2$ to y and further comprising;

lines $L_1$ and $L_2$ from said switch s in $C_1$ to $N_2$ so that packets can travel from x to y through $L_1$ or through $L_2$ and further including;

a scheduling unit SU that can reserve one of the lines $L_1$ and $L_2$ for the transmission of a message packet from x to y.

6. An interconnect structure according to claim 5 wherein the scheduling unit consists of a request switch, a number of request processors and an answer switch.

7. An interconnect structure according to claim 6 wherein the request and answer switches are Data Vortex™ switches.

8. An interconnect structure according to claim 5 wherein the scheduler makes scheduling decisions based at least in part on quality of service criterion.

9. An interconnect structure according to claim 5 wherein the scheduler makes scheduling decisions based at least in part on the time that the packet to be schedule has waited to be scheduled.

10. An interconnection network N consisting of first stage networks $NA_1$ and $NB_1$ and second stage networks $NA_2$ and $NB_2$ and a collection of devices D which are outside of the network N so that a device x in D sends data to a device y in D and;

data can travel from x to y with the data first being sent from x to $NA_1$ and then from $NA_1$ to $NA_2$ and then from $NA_2$ to y and;

data can travel from x to y with the data first being sent from x to $NB_1$ and then from $NB_1$ to $NB_2$ and then from $NB_2$ to y and;

$NA_1$ consists of a collection of building blocks;

$NB_1$ consists of a collection of building blocks;

there is a sequence $S=C_0, C_1, \ldots, C_{M-1}$ of clusters of devices so that each device in D is in cluster of the sequence and no device in D is in two clusters of the sequence and moreover:

there is a collection of interconnection lines connecting the devices in D to the networks $NA_1$ and $NB_1$;

for devices x and y in the member $C_T$ of S, x and y are connected to the same building block in $NA_1$ and to different building blocks in $NB_1$.

* * * * *